United States Patent
Lee et al.

(10) Patent No.: US 12,525,056 B2
(45) Date of Patent: Jan. 13, 2026

(54) METHOD AND DEVICE FOR MULTI-DNN-BASED FACE RECOGNITION USING PARALLEL-PROCESSING PIPELINES

(71) Applicant: Seoul National University R&DB Foundation, Seoul (KR)

(72) Inventors: Young Ki Lee, Seoul (KR); Ju Heon Yi, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 303 days.

(21) Appl. No.: 18/033,185

(22) PCT Filed: Apr. 22, 2022

(86) PCT No.: PCT/KR2022/005815
§ 371 (c)(1),
(2) Date: Apr. 21, 2023

(87) PCT Pub. No.: WO2022/225375
PCT Pub. Date: Oct. 27, 2022

(65) Prior Publication Data
US 2023/0394875 A1    Dec. 7, 2023

(30) Foreign Application Priority Data

Apr. 22, 2021  (KR) .................. 10-2021-0052382
Apr. 22, 2022  (KR) .................. 10-2022-0050391

(51) Int. Cl.
*G06V 40/16* (2022.01)
*G06T 7/174* (2017.01)
*G06V 10/82* (2022.01)

(52) U.S. Cl.
CPC ............ *G06V 40/172* (2022.01); *G06T 7/174* (2017.01); *G06V 10/82* (2022.01)

(58) Field of Classification Search
None
See application file for complete search history.

(56) References Cited

U.S. PATENT DOCUMENTS

2009/0262987 A1* 10/2009 Ioffe ................. G06T 11/60
                                                        382/103
2015/0131872 A1*  5/2015 Ganong ............ G06Q 30/0241
                                                        382/118

(Continued)

FOREIGN PATENT DOCUMENTS

JP      2020091559 A        6/2020
KR      20100134079 A    * 12/2010    ........... G06V 40/171

(Continued)

OTHER PUBLICATIONS

Juheon Yi, Sunghyun Choi, and Youngki Lee. 2020. EagleEye: wearable camera-based person identification in crowded urban spaces. In Proceedings of the 26th Annual International Conference on Mobile Computing and Networking (MobiCom '20). Association for Computing Machinery, Published: Apr. 17, 2020.*

(Continued)

*Primary Examiner* — Henok Shiferaw
(74) *Attorney, Agent, or Firm* — Cesari and McKenna, LLP

(57) ABSTRACT

A facial recognition method executed by a facial recognition apparatus includes detecting at least one face region in units of image blocks from an input image; determining an expected facial recognition difficulty level of the at least one face region; determining a recognition pipeline to perform facial recognition on each of the at least one face region among a plurality of recognition pipelines based on the expected facial recognition difficulty level; distributing the at least one face region to the determined recognition pipeline; and performing facial recognition from each of the (Continued)

at least one face region by a recognition pipeline to which the at least one face region is distributed.

15 Claims, 19 Drawing Sheets

(56) References Cited

U.S. PATENT DOCUMENTS

| | | | | |
|---|---|---|---|---|
| 2019/0188458 | A1* | 6/2019 | Kang | G06V 10/761 |
| 2020/0293803 | A1 | 9/2020 | Wajs et al. | |
| 2020/0401791 | A1* | 12/2020 | Gao | G06V 10/774 |
| 2022/0051017 | A1* | 2/2022 | Choi | G06N 3/047 |
| 2022/0207770 | A1* | 6/2022 | Liu | G06T 17/20 |
| 2022/0329847 | A1* | 10/2022 | Parashar | G06T 7/11 |

FOREIGN PATENT DOCUMENTS

| | | |
|---|---|---|
| KR | 1020100134079 A | 12/2010 |
| KR | 1020200046152 A | 5/2020 |

OTHER PUBLICATIONS

Deng, et al., RetinaFace: Single-stage Dense Face Localisation in the Wild, CVPR 2000, 10 pages.
Kanade, et al., An Iterative Image Registration Technique with an Application to Stereo Vision, 1981, Vancouver, British Columbia, Proceedings of Imaging Understanding Workshop, pp. 121-130.
He, et al., Deep Residual Learning for Image Recognition, CVPR 2016, pp. 770-778.
Deng, et al., ArcFace: Additive Angular Margin Loss of Deep Facial Recognition, CVPR 2019, Aug. 2015, 17 pages, Journal of Latex Class Files, vol. 14, No. 8.
Chen, et al., MobileFaceNets: Efficient CNNs for Accurate Real-Time Face Verification on Mobile Devices, CCBR 2018, 10 pages.
Cortes, et al., Support-vector Networks, Machine Learning, 1995, pp. 273-297, vol. 20, No. 3, Kluwer Academic Publishers, Boston.
Zheng, et al., Cross-Pose LFW: A Database for Studying Cross-Pose Facial Recognition in Unconstrained Environments, Beijing University of Posts and Telecommunications, Tech. Rep 2018, 6 pages.
Cao, et al., VGGFace2: A Dataset for Recognizing Faces Across Pose and Age, F&G 2018, 11 pages, IEEE.
Le, et al., UHDB31: A Dataset for Better Understanding Facial Recognition Across Pose and Illumination Variation, ICCV 2017, pp. 2555-2563.
International Search Report, International Application PCT/KR2022/005815, mailed Aug. 2, 2022, Translation, 3 pages.
Yi, Juheon, Sunghyun Choi, and Youngki Lee. "EagleEye: Wearable camera-based person identification in crowded urban spaces." Proceedings of the 26th Annual International Conference on Mobile Computing and Networking. 2020, 14 pages.

* cited by examiner

METHOD AND DEVICE FOR MULTI-DNN-BASED FACE RECOGNITION USING PARALLEL-PROCESSING PIPELINES

CROSS-REFERENCE TO RELATED APPLICATIONS

This application is the National Stage under 35 U.S.C. § 371 of International Application No. PCT/KR2022/005815, filed Apr. 22, 2022, which claims priority to both Korean Patent Application No. 10-2021-0052382 filed Apr. 22, 2021 and Korean Patent Application 10-2022-0050391, filed Apr. 22, 2022. Each of these applications is hereby incorporated by reference herein in its entirety.

FIELD OF THE INVENTION

The present invention relates to a multi-deep neural network (DNN)-based facial recognition method and apparatus, and more particularly to a facial recognition method and apparatus using content and a resource-adaptive parallel processing pipeline for optimal execution of a DNN-based facial recognition algorithm.

DESCRIPTION OF THE RELATED ART

Content to be described below is merely for the purpose of providing background information related to embodiments of the present invention, and it is obvious that the content to be described does not constitute the related art.

A facial recognition algorithm involves multiple DNN operations that execute a DNN for facial recognition per detected face after executing the DNN for face detection in an input image.

Recently, platforms capable of executing DNN operations in mobile devices have been developed. However, these platforms only execute a single DNN operation and do not efficiently support simultaneous execution of multiple DNNs required for facial recognition in a complex urban space. In addition, as a long latency is required for recognizing a large number of small faces, there is a limitation in that it is difficult to execute facial recognition of a moving target rapidly and in a timely manner.

In particular, when photographing an urban space using a camera of a mobile device, the number and composition of people in a scene significantly dynamically change, and thus dynamic scheduling regarding which facial recognition algorithm and which device are used to recognize a plurality of detected small faces is significantly important for effective facial recognition.

There is a need for technology capable of effectively executing multiple DNN operations for recognizing a plurality of low-resolution faces in a resource-limited mobile device.

Meanwhile, the aforementioned related art is technical information possessed by the inventor for derivation of the present invention or acquired during a process of deriving the present invention, and cannot necessarily be said to be known technology disclosed to the general public prior to the filing of the present invention.

SUMMARY OF THE INVENTION

Therefore, the present invention has been made in view of the above problems, and it is an object of the present invention to a facial recognition method and apparatus capable of effectively executing multiple DNN operations in a resource-limited mobile device.

It is another object of the present invention to provide a content-adaptive parallel processing pipeline for optimizing a processing speed of a facial recognition algorithm that repeatedly executes multiple DNN operations on an input image.

It is a further object of the present invention to provide a facial recognition method and apparatus for dynamically scheduling multiple DNN operations on an input image using a content and resource-adaptive parallel processing pipeline.

The objects of the present invention are not limited to the above-mentioned problems, and other objects and advantages of the present invention that are not mentioned may be understood by the following description, and will be more clearly understood by the embodiments of the present invention. It will be appreciated that the objects and advantages of the present invention may be realized by means and combinations thereof indicated in the claims.

In accordance with an aspect of the present invention, the above and other objects can be accomplished by the provision of a facial recognition method using a pipeline including a detection pipeline, a control pipeline, and a plurality of recognition pipelines, the facial recognition method including detecting, by a detection pipeline, a face region in units of image blocks from an input image including a plurality of image blocks, determining, by a control pipeline, one of a plurality of facial recognition models based on a facial recognition difficulty level of the detected face region, distributing, by the control pipeline, the detected face region to a recognition pipeline associated with the determined facial recognition model, and performing facial recognition from the detected face region by a recognition pipeline to which the detected face region is distributed.

In accordance with another aspect of the present invention, there is provided a facial recognition apparatus using a pipeline including a detection pipeline, a control pipeline, and a plurality of recognition pipelines, the facial recognition apparatus including at least one processor, in which the at least one processor is configured to execute a detection pipeline to detect a face region in units of image blocks from an input image including a plurality of image blocks, execute a control pipeline to determine one of a plurality of facial recognition models based on a facial recognition difficulty level of the detected face region, execute the control pipeline to distribute the detected face region to a recognition pipeline associated with the determined facial recognition model, and execute a recognition pipeline to which the detected face region is distributed to perform facial recognition from the detected face region.

In accordance with a further aspect of the present invention, there is provided a facial recognition system using a pipeline including a detection pipeline, a control pipeline, and a plurality of recognition pipelines, the facial recognition system including a first facial recognition apparatus in which at least some of a detection pipeline, a control pipeline, and a plurality of recognition pipelines are disposed, and a second facial recognition apparatus in which a remainder of the plurality of recognition pipelines is disposed, in which the first facial recognition apparatus is configured to detect, by the detection pipeline, a face region in units of image blocks from an input image including a plurality of image blocks, determine, by the control pipeline, one of a plurality of facial recognition models based on a facial recognition difficulty level of the detected face region, distribute, by the control pipeline, the detected face region to one of the first facial recognition apparatus and the second facial recognition apparatus in which a recognition pipeline associated with the determined facial recognition model is disposed, and detect a face region for a subsequent image block of the input image by the detection pipeline while facial recognition for the detected face region is performed by a recognition pipeline to which the detected face region is distributed.

In accordance with a further aspect of the present invention, there is provided a facial recognition method executed by a facial recognition apparatus including a processor using a pipeline including a detection pipeline, a control pipeline, and a plurality of recognition pipelines, the facial recognition method including detecting, by a detection pipeline, at least one face region in units of image blocks from an input image, determining, by a control pipeline, an expected facial recognition difficulty level of the at least one face region, determining, by the control pipeline, a recognition pipeline to perform facial recognition on each of the at least one face region among the plurality of recognition pipelines based on the expected facial recognition difficulty level, distributing, by the control pipeline, the at least one face region to the determined recognition pipeline, and performing facial recognition from each of the at least one face region by a recognition pipeline to which the at least one face region is distributed.

In accordance with a further aspect of the present invention, there is provided a facial recognition apparatus using a pipeline including a detection pipeline, a control pipeline, and a plurality of recognition pipelines, the facial recognition method including at least one processor, in which the at least one processor is configured to execute a detection pipeline to detect at least one face region in units of image blocks from an input image, execute a control pipeline to determine an expected facial recognition difficulty level of the at least one face region, execute the control pipeline to determine a recognition pipeline to perform facial recognition for each of the at least one face region among the plurality of recognition pipelines based on the expected facial recognition difficulty level, and execute the control pipeline to distribute the at least one face region to the determined recognition pipeline.

In accordance with a further aspect of the present invention, there is provided a facial recognition system using a pipeline including a detection pipeline, a control pipeline, and a plurality of recognition pipelines, the facial recognition system including a first facial recognition apparatus in which at least some of a detection pipeline, a control pipeline, and a plurality of recognition pipelines are disposed, and a second facial recognition apparatus in which a remainder of the plurality of recognition pipelines is disposed, in which the first facial recognition apparatus is configured to detect, by the detection pipeline, at least one face region in units of image blocks from an input image, determine, by the control pipeline, an expected facial recognition difficulty level of the at least one face region, determine, by the control pipeline, a recognition pipeline to perform facial recognition on each of the at least one face region among the plurality of recognition pipelines based on the expected facial recognition difficulty level, distribute, by the control pipeline, the at least one face region to the determined recognition pipeline, and detect a face region for a subsequent image block of the input image by the detection pipeline while facial recognition for the detected face region is performed by a recognition pipeline to which the at least one face region is distributed.

Other aspects, features, and advantages other than those described above will become apparent from the following drawings, claims, and detailed description of the invention.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
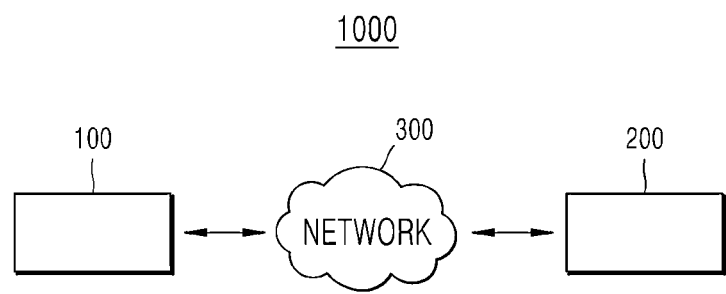
FIG. 1 is a schematic illustrative diagram of an operating environment of a facial recognition system according to an embodiment.

Hereinafter, the present invention will be described in more detail with reference to the drawings. The present invention may be embodied in various different forms, and is not limited to the embodiments described herein. In the following embodiments, parts not directly related to the description are omitted in order to clearly describe the present invention. However, in implementing the apparatus or system to which the idea of the present invention is applied, this does not mean that the omitted configuration is unnecessary. In addition, the same reference numerals are used throughout the specification to refer to the same or similar components.

Terms such as first, second, etc. may be used to describe various components. However, the components should not be limited by the terms. The above terms are used only for the purpose of distinguishing one component from another. In addition, in the following description, a singular expression includes a plural expression unless the context clearly dictates otherwise.

In the following description, it should be understood that a term such as "include" or "have" is intended to designate that a feature, number, step, operation, component, part, or a combination thereof described in the specification is present, and does preclude the possibility of the presence or addition of one or more other features, numbers, steps, operations, components, parts, or combinations thereof.

Hereinafter, the present invention will be described in detail with reference to the drawings.

FIG. 1 is a schematic illustrative diagram of an operating environment of a facial recognition system according to an embodiment.

A facial recognition system 1000 according to the embodiment provides high-speed and high-precision facial recognition (for example, finding missing children and tracking criminals) in a complex urban space. The facial recognition system 1000 performs a facial recognition process on an input image in parallel by utilizing a mobile heterogeneous processor (for example, a central processing unit (CPU) and a graphics processing unit (GPU)) and cloud computing, and displays a recognition result on a display (for example, in the form of Augmented Reality (AR)) in real time to assist a user in recognition.

Facial recognition technology according to the embodiment is technology for high-precision facial recognition in a high-complexity space, and may be applied to a DNN-based facial recognition algorithm to increase a processing speed of image-based facial recognition. For example, the high-complexity space includes a crowded space, such as an urban space with a high flow of people, a transit station during rush hour, a sports stadium with a large crowd, or a shopping mall.

For example, the facial recognition process according to the embodiment may rapidly recognize a plurality of small faces at a long distance included in an acquired image using a camera of a terminal such as a smartphone, wearable glasses, or a closed circuit television (CCTV) in a high-complexity space.

The facial recognition system 1000 according to the embodiment may include at least one facial recognition apparatus. For example, the facial recognition system 1000 may include a first facial recognition apparatus 100 and a second facial recognition apparatus 200, and the present invention is not limited thereto. The facial recognition system 1000 may include one or more facial recognition apparatuses.

The first facial recognition apparatus 100 and the second facial recognition apparatus 200 may cooperate with each other to perform a facial recognition operation on an input image.

For example, according to a facial recognition difficulty level of a detected face region in the input image, a face region having a relatively low facial recognition difficulty level may be processed by the first facial recognition apparatus 100, and a face region having a relatively high facial recognition difficulty level may be processed by the second facial recognition apparatus 200. In this process, the first facial recognition apparatus 100 and the second facial recognition apparatus may execute different facial recognition models.

The first facial recognition apparatus 100 and the second facial recognition apparatus 200 may recognize a face appearing in an input face image by executing a facial recognition method according to an embodiment.

The first facial recognition apparatus 100 and the second facial recognition apparatus 200 may execute the facial recognition method according to the embodiment by using a pre-trained facial recognition model. The first facial recognition apparatus 100 and the second facial recognition apparatus 200 may receive at least one pre-trained facial recognition model through a network 300.

For example, the first facial recognition apparatus 100 may receive a facial recognition model trained by the second facial recognition apparatus 200 through the network 300. For example, the first facial recognition apparatus 100 may train a facial recognition model in an on-device manner, and transmit the trained facial recognition model to an external device connected through the network 300, for example, the second facial recognition apparatus 200.

Here, the facial recognition model may have a multi-DNN structure including a DNN for face detection, an identity clarification model (identity clarification network (ICN)) for a detected face, and a facial recognition DNN. The facial recognition model may include a plurality of facial recognition models.

The first facial recognition apparatus 100 may directly acquire the input image. For example, the first facial recognition apparatus 100 may be implemented as a terminal including a camera. The first facial recognition apparatus 100 may acquire an input image from an external device through the network 300.

Here, the input image refers to a moving image including a series of image frames, each frame of the moving image, or a still image.

In an example, the first facial recognition apparatus 100 may be implemented as a terminal. In an example, the second facial recognition apparatus 200 may be implemented as a server.

Here, the terminal may be a desktop computer, a smartphone, a notebook computer, a tablet computer, a smart TV, a mobile phone, a personal digital assistant (PDA), a laptop, a digital camera, a home appliance, or another mobile or non-mobile computing devices operated by the user. However, the present invention is not limited thereto. In addition, the terminal may be a wearable device such as a watch, glasses, a hair band, or a ring having a communication function and a data processing function.

The server may be an application server or a cloud server that executes the facial recognition method according to the embodiment. However, the present invention is not limited thereto.

The first facial recognition apparatus 100 and the second facial recognition apparatus 200 may execute an application for executing the facial recognition method according to the embodiment to perform facial recognition on the input image.

The network 300 may be a wired and wireless network, for example, a local area network (LAN), a wide area network (WAN), the Internet, an intranet, or an extranet, a mobile network such as a cellular, 3G, LTE, 5G, Wi-Fi network, or an ad hoc network, or any suitable communication network including a combination thereof.

The network 300 may include a connection of network elements such as a hub, a bridge, a router, a switch, and a gateway. The network 300 may include one or more connected networks including a public network such as the Internet and a private network such as a secure enterprise private network, for example, a multi-network environment. Access to the network 300 may be provided through one or more wired or wireless access networks.

Figure 2:
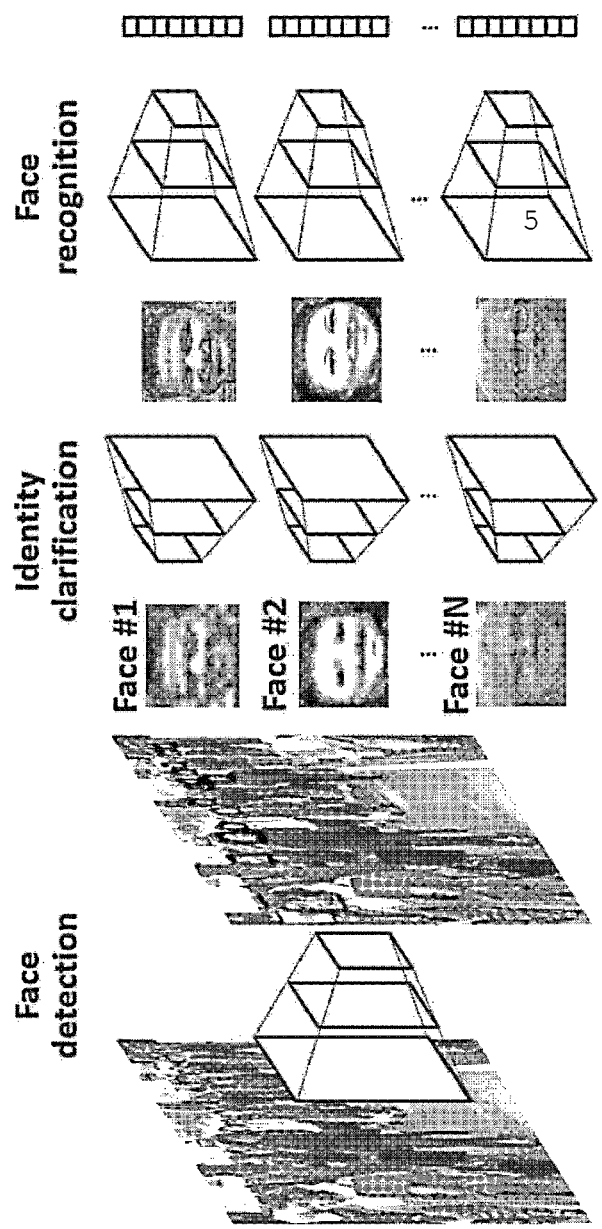
FIG. 2 is a diagram for describing illustrative multiple DNNs executed in a facial recognition process according to an embodiment.

FIG. 2 is a diagram for describing illustrative multiple DNNs executed in the facial recognition process according to an embodiment.

The multiple DNNs executed in the facial recognition process may include a face detection model, an identity clarification model, and a facial recognition model.

The face detection model receives an image and outputs at least one face region included in the image. The identity clarification model receives each face region of the at least one face region, improves image resolution, and outputs each face region. The facial recognition model receives each face region and outputs a feature vector.

The face detection model is executed on the input image, and the identity clarification model and the facial recognition model are executed for each face region included in the input image. Thus, as the face region included in the input image increases, the computational complexity of the multiple DNNs increases.

The facial recognition system according to the embodiment may simultaneously perform the facial recognition process according to the embodiment in parallel in a resource-limited mobile device and the cloud. To this end, the input image is divided into a plurality of image blocks, and facial recognition is performed in units of image blocks.

In addition, the facial recognition system according to the embodiment adaptively determines a facial recognition model to be applied to an individual face region according to a recognition difficulty level of the face region of the input image. For example, as the facial recognition difficulty level increases, a facial recognition model having high computational complexity may be selected.

Figure 3:
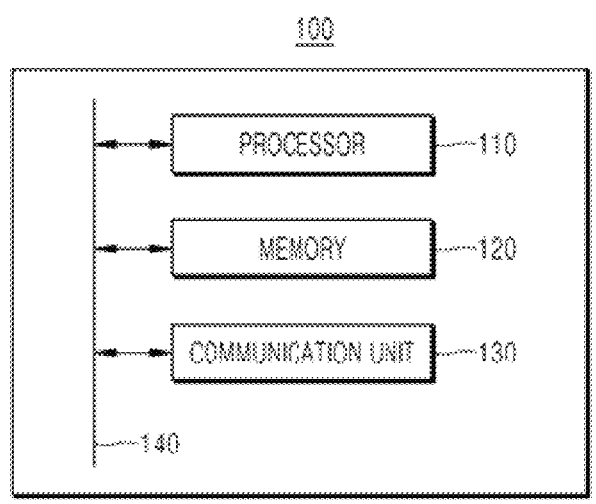
FIG. 3 is a block diagram of a facial recognition apparatus according to an embodiment.

FIG. 3 is a block diagram of the facial recognition apparatus according to the embodiment.

The first facial recognition apparatus 100 according to the embodiment may include a memory 120 and a processor 110. Such a configuration is illustrative, and the first facial recognition apparatus 100 may include some of the elements illustrated in FIG. 3, or additionally include elements not illustrated in FIG. 3 and necessary for operation of the apparatus.

The processor 110 is a type of CPU, and may execute one or more commands stored in the memory 120 to control the operation of the first facial recognition apparatus 100.

The processor 110 may include any type of device capable of processing data. The processor 110 may refer to, for example, a data processing device embedded in hardware having a physically structured circuit to perform a function expressed as code or an instruction included in a program.

As an example of the data processing device embedded in hardware as described above, it is possible to encompass processing devices such as a microprocessor, a CPU, a processor core, a multiprocessor, a GPU, an application-specific integrated circuit (ASIC), and a field programmable gate array (FPGA). However, the present invention is not limited thereto. The processor 110 may include one or more processors. The processor 110 may include a heterogeneous processor, for example, a CPU and a GPU.

The memory 120 may store a program including one or more instructions for executing the facial recognition process according to an embodiment. The processor 110 may execute the facial recognition process according to the embodiment based on a program and commands stored in the memory 120.

The memory 120 may store a DNN-based model (for example, a face detection model, an identity clarification model, and/or a plurality of facial recognition models) executed for facial recognition, and further store intermediate data and an operation result generated in an operation process for facial recognition. For example, the memory 120 may store a lightweight facial recognition model, which will be described later with reference to FIGS. 4 and 8.

The memory 120 may include an internal memory and/or an external memory, and may include a volatile memory such as a DRAM, an SRAM, or an SDRAM, a non-volatile memory such as one time programmable ROM (OTPROM), a PROM, an EPROM, an EEPROM, a mask ROM, a flash ROM, a NAND Flash memory, or a NOR flash memory, a flash drive such as an SSD, a compact flash (CF) card, an SD card, a Micro-SD card, a Mini-SD card, an Xd card, or a memory stick, and a storage device such as an HDD. The memory 120 may include, but is not limited to, magnetic storage media or flash storage media.

The first facial recognition apparatus 100 according to the embodiment may further include a communication unit 130.

The communication unit 130 includes a communication interface for transmitting and receiving data of the first facial recognition apparatus 100. The communication unit 130 may connect the first facial recognition apparatus 100 to the network 300 with reference to FIG. 1 by providing various types of wired/wireless communication paths to the first facial recognition apparatus 100.

The first facial recognition apparatus 100 may transmit/receive an input image, training data, intermediate data, and a feature vector extracted as a result of facial recognition through the communication unit 130. The communication unit 130 may be configured to include, for example, at least one of various wireless Internet modules, short-range communication modules, GPS modules, modems for mobile communication, etc.

The first facial recognition apparatus 100 may further include a bus 140 that provides a physical/logical connection path among the processor 110, the memory 120, and the communication unit 130.

The facial recognition process according to the embodiment is processed in parallel using a pipeline. The pipeline may include a detection pipeline, a control pipeline, and a plurality of recognition pipelines, and the pipeline will be described in detail with reference to FIG. 6.

The first facial recognition apparatus 100 may include at least one processor 110. The at least one processor 110 may be configured to execute a detection pipeline to detect a face region in units of image blocks from an input image including a plurality of image blocks, execute a control pipeline to determine one facial recognition model from among a plurality of facial recognition models based on a facial recognition difficulty level of the detected face region, execute a control pipeline to distribute the detected face region to a recognition pipeline associated with the determined facial recognition model, and execute the recognition pipeline, to which the detected face region is distributed, to perform facial recognition from the detected face region, which will be described later with reference to FIG. 5.

Figure 7:
FIGS. 7A to 7C are diagrams illustrating background removal in the facial recognition method according to an embodiment.

The at least one processor 110 may be configured to divide an input image into a plurality of image blocks, and to remove a background region from each image block based on the edge density of each image block in order to detect a face region, which will be described later with reference to FIGS. 7A to 7C.

In order to determine one facial recognition model from among a plurality of facial recognition models based on a facial recognition difficulty level of a detected face region, the at least one processor 110 may be configured to determine a facial recognition difficulty level based on the face resolution and facial posture displayed in the detected face region. The at least one processor 110 may be configured to extract a face landmark from the face region and determine a facial posture based on a positional relationship between the face landmarks in order to determine the facial recognition difficulty level, which will be described with reference to FIG. 8.

In an example, at least some of the detection pipeline, the control pipeline, and the plurality of recognition pipelines may be disposed in the first facial recognition apparatus 100, and the remainder of the plurality of recognition pipelines may be disposed in the second facial recognition apparatus 200. The at least one processor 110 may be configured to offload facial recognition for the detected face region from the first facial recognition apparatus to the second facial recognition apparatus in order to distribute the detected face region.

For example, a facial recognition model associated with a recognition pipeline disposed in the second facial recognition apparatus 200 may be a facial recognition model having higher computational complexity than that of a facial recognition model associated with a recognition pipeline disposed in the first facial recognition apparatus 100, which will be described later with reference to FIGS. 6, 8 and 9.

The at least one processor 110 may be configured to extract a feature vector of a face appearing in a detected face region by executing a previously determined facial recognition model in order to perform facial recognition.

The at least one processor 110 may be configured to detect a face region for a subsequent image block of an input image by the detection pipeline while facial recognition is performed on a face region detected by the recognition pipeline in order to detect the face region, which will be described later with reference to FIGS. 6 and 9.

The at least one processor 110 may be configured to determine a face region matching a search target based on facial recognition results of a plurality of recognition pipelines for an input image.

Meanwhile, the second facial recognition apparatus 200 may include a memory (not illustrated) and a processor (not illustrated).

The second facial recognition apparatus 200 may receive face region information from the first facial recognition apparatus 100, perform facial recognition on the received face region information, and transmit a facial recognition result to the first facial recognition apparatus 100.

To this end, the memory of the second facial recognition apparatus 200 may store an identity clarification model (ICN) and a heavy facial recognition model, which will be described later with reference to FIGS. 4 and 8.

The processor of the second facial recognition apparatus 200 may perform facial recognition on an individual face region offloaded from the first facial recognition apparatus 100.

To this end, the processor of the second facial recognition apparatus 200 may be configured to execute the identity clarification model (ICN) and/or the heavy facial recognition model stored in the memory to perform facial recognition on face region information received from the first facial recognition apparatus 100. In an example, the processor of the second facial recognition apparatus 200 may include a plurality of GPUs.

The first facial recognition apparatus 100 according to the embodiment includes at least one processor 110, and the at least one processor 110 may be configured to execute a detection pipeline to detect at least one face region in units of image blocks from an input image, execute a control pipeline to determine an expected facial recognition difficulty level of the at least one face region, execute a control pipeline to determine a recognition pipeline to perform facial recognition for each of the at least one face region among a plurality of recognition pipelines based on the expected facial recognition difficulty level, and execute a control pipeline to distribute the at least one face region to the determined recognition pipeline.

The at least one processor 110 may be configured to determine each expected facial recognition difficulty level of the at least one face region based on at least one of the face resolution, the facial posture, or the facial blur of the face region, in order to determine the expected facial recognition difficulty level.

The at least one processor 110 may be configured to determine a recognition pipeline of each face region of the at least one face region in ascending order of the expected facial recognition difficulty level in order to determine the recognition pipeline.

The at least one processor 110 may be configured to determine a combination of a facial recognition model to be applied to a face region and a facial recognition apparatus to execute the facial recognition model based on a predetermined target function according to an expected facial recognition accuracy of the face region and an expected operation latency, in order to determine a recognition pipeline.

In an example, it is possible to adopt a configuration in which at least some of the detection pipeline, the control pipeline, and the plurality of recognition pipelines are disposed in the first facial recognition apparatus 100, the remainder of the plurality of recognition pipelines is disposed in the second facial recognition apparatus 200, and the at least one processor 110 offloads facial recognition for at least some of the at least one face region from the first facial recognition apparatus 100 to the second facial recognition apparatus 200 in order to distribute the at least one face region.

The at least one processor 110 may be configured to detect a face region for a subsequent image block of an input image by the detection pipeline while facial recognition for at least one face region is performed by the recognition pipeline to which the at least one face region is distributed.

The at least one processor 110 may be configured to determine a face region matching a search target based on a facial recognition result of the plurality of recognition pipelines for an input image.

Facial Recognition Apparatus

An input image includes a series of image frames, and the at least one processor 110 may be configured to search for a previously recognized face region corresponding to each of at least one face region based on face region movement information between successive image frames of a series of image frames, and reuse facial recognition information of the previously recognized face region according to a search result.

According to an embodiment, a facial recognition system using a pipeline including a detection pipeline, a control pipeline, and a plurality of recognition pipelines is provided.

The facial recognition system according to the embodiment includes the first facial recognition apparatus 100 in which at least some of a detection pipeline, a control pipeline, and a plurality of recognition pipelines are disposed, and the second facial recognition apparatus 200 in which the remainder of the plurality of recognition pipelines is disposed. The first facial recognition apparatus 100 may be configured to detect, by the detection pipeline, at least one face region in units of image blocks from an input image, determine, by the control pipeline, an expected facial recognition difficulty level of at least one face region, determine, by the control pipeline, a recognition pipeline to perform facial recognition on each of at least one face region among a plurality of recognition pipelines based on the expected facial recognition difficulty level, distribute, by the control pipeline, at least one face region to the determined recognition pipeline, and detect a face region for a subsequent image block of the input image by the detection pipeline while facial recognition is performed on a face region detected by the recognition pipeline to which the at least one face region is distributed. FIG. 4 is a diagram for describing a facial recognition process according to an embodiment.

Figure 4:
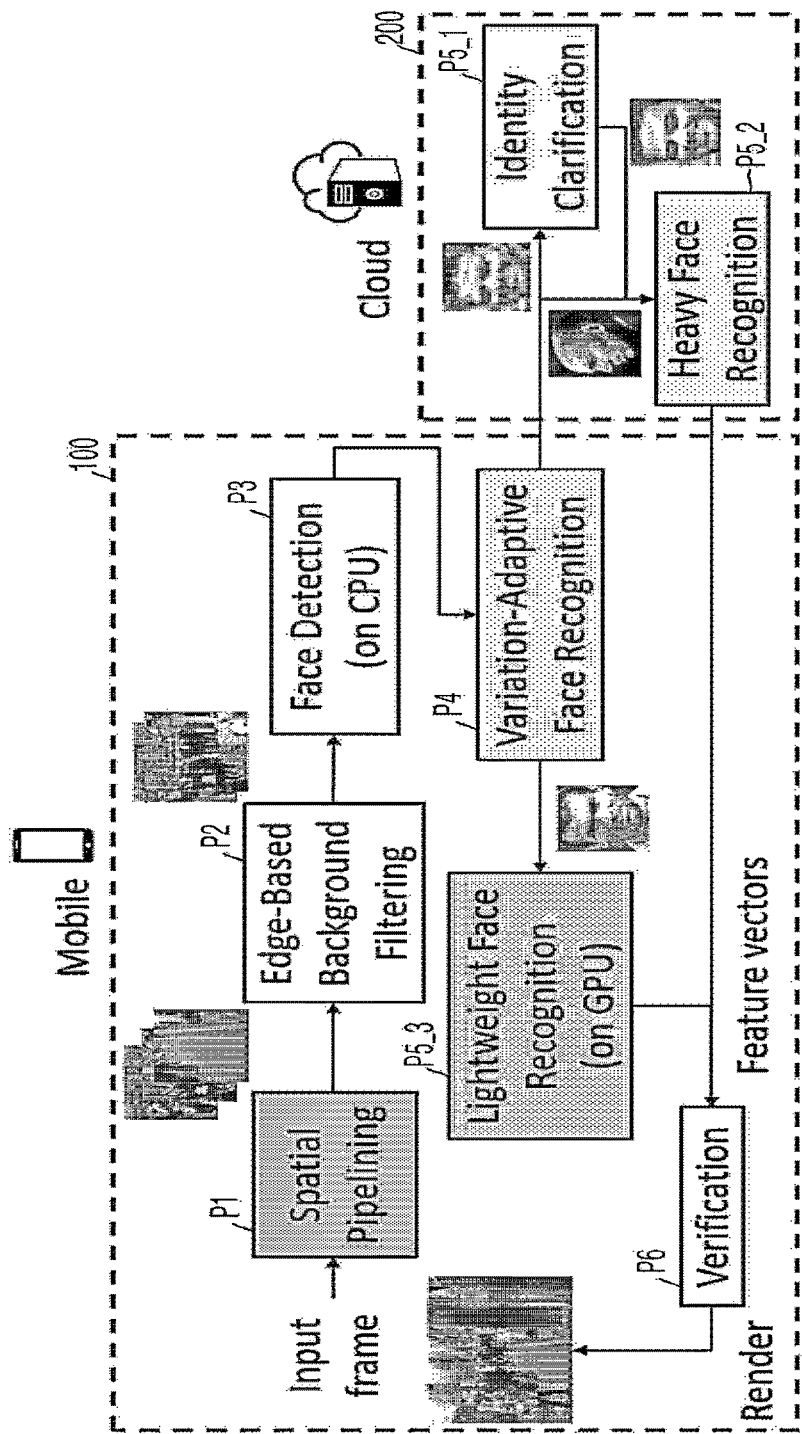
FIG. 4 is a diagram for describing the facial recognition process according to an embodiment.

A facial recognition method according to an embodiment is performed by steps P1, P2, P3, P4, P5_1, P5_2, P5_3, and P6 illustrated in FIG. 4 by the first facial recognition apparatus 100 and the second facial recognition apparatus 200.

All or some of steps P1, P2, P3, P4, P5_1, P5_2, P5_3, and P6 illustrated in FIG. 4 may be performed in the facial recognition process for an input frame. An execution order of steps P1, P2, P3, P4, P5_1, P5_2, P5_3, and P6 illustrated in FIG. 4 may be changed. For example, step P2 may be performed before step P1 or vice versa.

In step P1, the first facial recognition apparatus 100 acquires an input image (input frame). For example, a camera frame input photographed by AR glasses or a smartphone may be acquired in real time.

In step P1, the first facial recognition apparatus 100 divides an input image (input frame) into a plurality of image blocks, and brings the image blocks to a content-adaptive parallel processing pipeline (for example, detection pipeline) in units of image blocks. For example, the input image may be divided into n×m image blocks (n and m being positive integers). For example, it is possible to divide the input image into image blocks having the same breadth and width.

As a result, parallel processing and pipelining for each image region start, the input frame is divided for each image block to perform face detection, and parallel processing and pipelining using a mobile CPU, a GPU, and a cloud GPU for each detected face region are provided, so that it is possible to optimize a time required for facial recognition.

In step P2, the first facial recognition apparatus 100 executes an edge detection algorithm before executing a face detection DNN on the image block fetched in step P1, thereby removing a background region where no face is present (edge-based background filtering).

In step P2, an edge (outline) is detected for each image block of the input frame, so that a region having a low edge density is regarded as a background region and excluded from subsequent processing to reduce unnecessary operations.

In another example, step P2 may be executed prior to step P1. For example, the first facial recognition apparatus 100 may execute an edge detection algorithm on the input image in step P2, divide a remaining region, from which the background region is removed, into a plurality of image blocks in step P1, and brings the image blocks to a pipeline (for example, detection pipeline).

In step P3, the first facial recognition apparatus 100 detects a face region by executing a face detection model on an image block, from which the background region is removed. Here, the face detection model may utilize a RetinaFace structure.

In an example, step P3 may be executed in a detection pipeline. For example, the detection pipeline may be executed by a CPU in the at least one processor 110 of the first facial recognition apparatus 100.

The face region detected in step P3 is transmitted to the control pipeline in units of face regions.

In step P4, the first facial recognition apparatus 100 determines a facial recognition model to perform a facial recognition operation for a detected face region according to a facial recognition difficulty level for the detected face region (for example, prediction based on the image resolution and posture of the detected face) (variation-adaptive facial recognition). Accordingly, the complexity of the facial recognition DNN may be adaptively adjusted according to the facial recognition difficulty level, and an execution time may be optimized while obtaining high facial recognition accuracy.

In an example, step P4 may be executed in a control pipeline. For example, the control pipeline may be executed by a CPU in the at least one processor 110 of the first facial recognition apparatus 100.

In step P4, one of a plurality of facial recognition models having different computational complexities is determined according to the facial recognition difficulty level of the detected face region. The pipeline includes a plurality of recognition pipelines, and each of the recognition pipelines is assigned in association with each facial recognition model.

The face region is distributed to a recognition pipeline associated with the facial recognition model determined in step P4. For example, in step P4, the face region is distributed to a recognition pipeline associated with one of steps P5_1, P5_2, and P5_3. In this way, the facial recognition operation for different regions of the input image is performed in parallel by a heterogeneous processor (for example, mobile CPU and GPU) of the first facial recognition apparatus 100 and a processor (for example, GPU of the cloud server) of the second facial recognition apparatus 200.

Meanwhile, steps P5_1 and P5_2 may be performed by the second facial recognition apparatus 200. To this end, the first facial recognition apparatus 200 transmits the face region distributed in step P5_1 or step P5_2 to a recognition pipeline associated with step P5_1 or a recognition pipeline associated with step P5_2. In an example, the recognition pipeline may be executed on the GPU of the facial recognition apparatus on which the recognition pipeline is disposed.

Step P5_1 executes an identity clarification model that improves the image resolution of a face region, and step P5_2 executes a heavy facial recognition model that processes a face region having a high facial recognition difficulty level, respectively. Step 5_3 executes a lightweight facial recognition model that processes a face region having a low facial recognition difficulty level.

For example, the identity clarification model may utilize a network structure illustrated in FIG. 11, which will be described later. For example, the heavy facial recognition model may utilize a residual block-based ArcFace network structure. For example, a lightweight facial recognition model may utilize a lightweight MobileFaceNets structure.

On a modern smartphone, the heavy facial recognition model and the lightweight recognition model exhibit a difference in complexity of about 20 times (for example, on an LG V50, an execution time of 287 ms in the case of ArcFace model, and an execution time of 14 ms in the case of MobileFaceNets).

In step P6, recognition results of respective facial recognition models are integrated, and a face region matching a search target and/or a similarity between the search target and face regions are rendered and displayed in an input frame.

Figure 5:
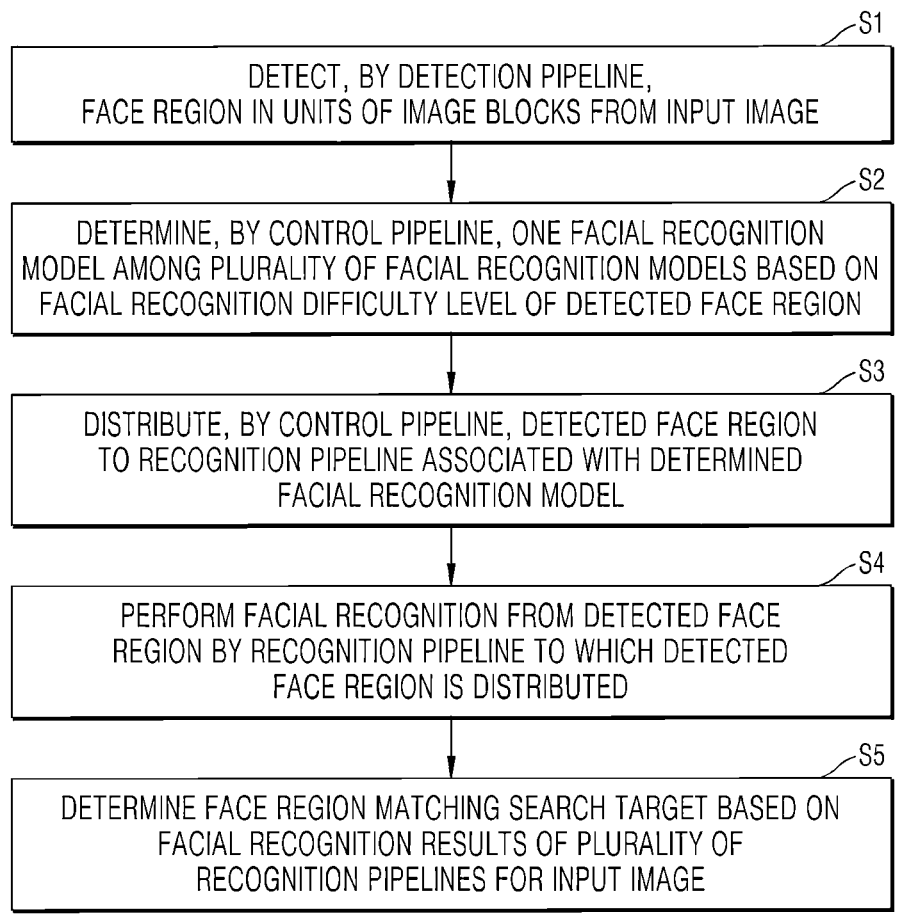
FIG. 5 is a flowchart of a facial recognition method according to an embodiment.

FIG. 5 is a flowchart of a facial recognition method according to an embodiment.

The facial recognition method according to the embodiment uses a pipeline including a detection pipeline, a control pipeline, and a plurality of recognition pipelines, and may include step S1 of detecting, by the detection pipeline, a face region in units of image blocks from an input image including a plurality of image blocks, step S2 of determining, by the control pipeline, one facial recognition model among a plurality of facial recognition models based on a facial recognition difficulty level of the face region detected in step S1, step S3 of distributing, by the control pipeline, the face region detected in step S1 to a recognition pipeline associated with the facial recognition model determined in step S2, and step S4 of performing facial recognition from the detected face region by the recognition pipeline to which the detected face region is distributed.

Steps S1 to S3 are executed by the first facial recognition apparatus 100, and the first facial recognition apparatus 100 executes and manages at least some of the detection pipeline, the control pipeline, and the plurality of recognition pipelines.

In step S1, the first facial recognition apparatus 100 detects, by the detection pipeline, a face region in units of image blocks from an input image including a plurality of image blocks. Step S1 corresponds to step P1, step P2 and step P3 with reference to FIG. 4.

Step S1 may include a step of dividing the input image into a plurality of image blocks (step P1 with reference to FIG. 4), and a step of removing a background region from each image block based on the edge density of each image block (step P2 of FIG. 4).

Hereinafter, removal of the background region will be described with reference to FIGS. 7A to 7C.

FIGS. 7A to 7C are diagrams illustrating background removal in the facial recognition method according to an embodiment.

When a face detection DNN is performed on a complex urban spatial image, a long latency occurs since a high-resolution image needs to be processed. For optimization thereof, after filtering out a region in which no face is present in the image, face detection is performed on a remaining region. A process of filtering out the region in which no face is present in the image is referred to as edge-based background filtering.

When edge detection is performed on the input image, a background region in which no face is present may be detected.

In an example, the input image is divided into blocks, blocks having an edge density less than or equal to a reference density are removed, and face detection is performed on a remaining region.

FIGS. 7A to 7C illustrate exemplary results of edge detection and background region removal. FIG. 7A illustrates a raw input image, FIG. 7B illustrates an edge detection result image for FIG. 7A, and FIG. 7C illustrates an image from which a background region is removed based on an edge detection result.

On average, it has been confirmed that a speed can be improved by 1.76 times by sacrificing 8.7% of face detection accuracy by utilizing edge detection.

Returning to FIG. 5, in step S2, the first facial recognition apparatus 100 determines, by a control pipeline, one of a plurality of facial recognition models based on a facial recognition difficulty level of the face region detected in step S1.

Step S2 and step S3 to be described later correspond to step P4 with reference to FIG. 4.

Step S2 includes a step of determining a facial recognition difficulty level based on the face resolution and the facial posture displayed in the face region detected in step S1.

To this end, the step of determining the facial recognition difficulty level may include a step of extracting face landmarks from the detected face region and a step of determining a facial posture based on a positional relationship between the extracted face landmarks.

In the step of extracting the face landmarks from the detected face region, the face landmarks (for example, eye, nose, and mouth position information) are from the detected face region.

In the step of determining the facial posture based on the extracted positional relationship between the face landmarks, a facial posture (for example, a frontal posture or a side posture) is determined according to the positional relationship between the landmarks.

In step S2, the facial recognition difficulty level is determined based on the face resolution and the facial posture, and different facial recognition DNN models are adaptively determined according to the determined facial recognition difficulty level. In this way, it is possible to achieve optimal facial recognition accuracy and latency performance.

Hereinafter, step S2 will be illustratively described with reference to FIG. 8.

Figure 8:
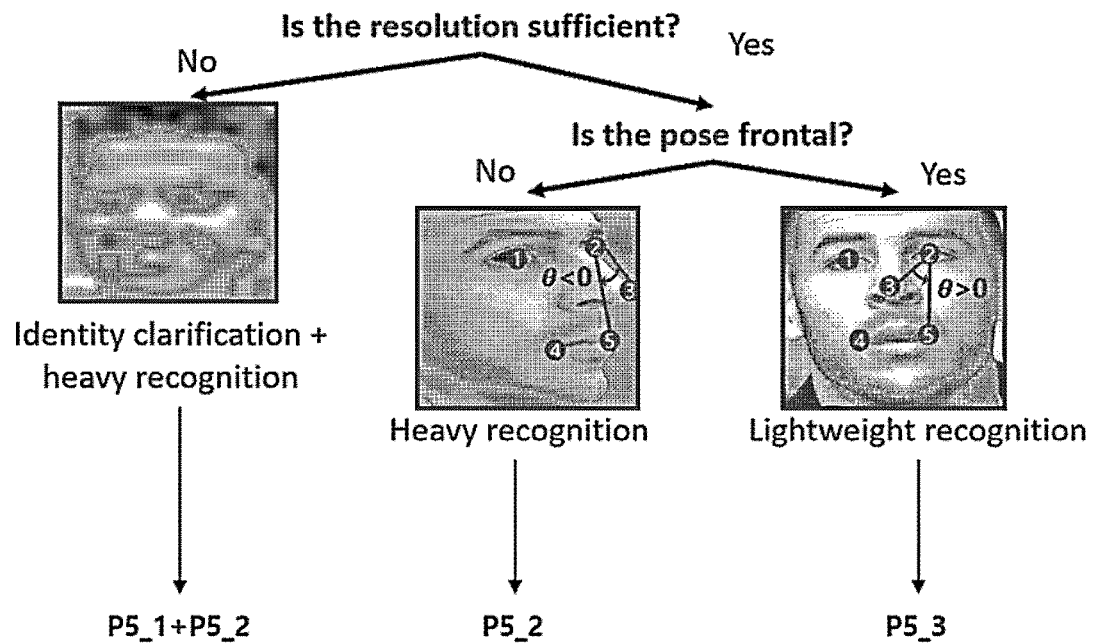
FIG. 8 is a diagram for describing a process of determining a facial recognition model in the facial recognition method according to an embodiment.

FIG. 8 is a diagram for describing a process of determining a facial recognition model in the facial recognition method according to an embodiment.

When a face is detected in an urban spatial image including a plurality of faces, a large deviation occurs in the facial recognition difficulty level according to an environment in which individual faces are captured. For example, in the case of a large face close to a camera, accurate recognition is possible even with a lightweight facial recognition DNN, whereas in the case of a low-resolution face far away from the camera, accurate recognition is possible only by applying a complex facial recognition DNN after identity clarification by identity resolution improvement.

Accordingly, in step S2 of FIG. 5, a facial recognition model is adaptively determined according to a face change in the detected face region (variation-adaptive facial recognition).

For example, when the face resolution is less than a predetermined reference value, the facial recognition difficulty level may be determined as "high", and an identity clarification model P5_1 and a heavy facial recognition model P5_2 may be selected.

For example, when the face resolution is greater than or equal to the predetermined reference value, and the facial posture is the side posture, the facial recognition difficulty level may be determined as "medium", and the heavy facial recognition model P5_2 may be selected.

For example, when the face resolution is greater than or equal to the predetermined reference value, and the facial posture is the frontal posture, the facial recognition difficulty level may be determined as "low", and a lightweight facial recognition model P5_3 may be selected.

In an example, one of the frontal posture and the side posture may be determined as the facial posture depending on the size of an angle θ formed by a line connecting an eye (NO. 2) and a mouth (No. 5) and a line connecting the eye (NO. 2) and a nose (No. 3) at the eye (NO. 2).

Returning to FIG. 5 again, in step S3, the first facial recognition apparatus 100 distributes, by the control pipeline, the face region detected in step S1 to a recognition pipeline associated with the facial recognition model determined in step S2.

In an example, at least some of the detection pipeline, the control pipeline, and the plurality of recognition pipelines are disposed in the first facial recognition apparatus 100, and the remainder of the plurality of recognition pipelines is disposed in the second facial recognition apparatus 200.

In an example, a facial recognition model associated with the recognition pipeline disposed in the second facial recognition apparatus 200 may be a facial recognition model having a higher computational complexity than that of a facial recognition model associated with the recognition pipeline disposed in the first facial recognition apparatus 100.

For example, the facial recognition model associated with the recognition pipeline disposed in the first facial recognition apparatus 100 may be a lightweight facial recognition model, and the facial recognition model associated with the recognition pipeline disposed in the second facial recognition apparatus 200 may be an identity clarification model and a heavy facial recognition model.

Step S3 may include offloading facial recognition for the detected face region from the first facial recognition apparatus 100 to the second facial recognition apparatus 200.

For example, the first facial recognition apparatus 100 is a resource-limited terminal, the second facial recognition apparatus 200 is a cloud server rich in computational resources, and the first facial recognition apparatus 100 transmits a face region requiring facial recognition by the heavy facial recognition model to the second facial recognition apparatus 200 to deliver a facial recognition task so that the second facial recognition apparatus 200 performs facial recognition for the face region.

In step S4, facial recognition is performed from the detected face region by the recognition pipeline to which the detected face region is distributed.

In step S4, the facial recognition model determined in step S2 is executed with respect to the detected face region to extract a feature vector of the face appearing in the detected face region.

Step S4 corresponds to step P5_1, step P5_2, and step P5_3 with reference to FIG. 4.

The facial recognition method according to the embodiment may further include a step of detecting a face region for a subsequent image block of the input image by the detection pipeline while facial recognition for the face region detected by the recognition pipeline is performed in step S4. That is, the detection pipeline, the control pipeline, and the plurality of recognition pipelines operate in parallel. Parallel processing of the pipeline will be described later with reference to FIGS. 6 and 9.

The facial recognition method according to the embodiment may further include step S5 of determining a face region matching a search target based on facial recognition results of a plurality of recognition pipelines for the input image.

Step S5 corresponds to step P6 with reference to FIG. 4.

In step S5, recognition result integration and rendering by each facial recognition model are performed. By comparing individual faces recognized from the input image by step S5 with the search target, a location of the face matching the search target may be rendered on a screen and shown to the user.

Figure 6:
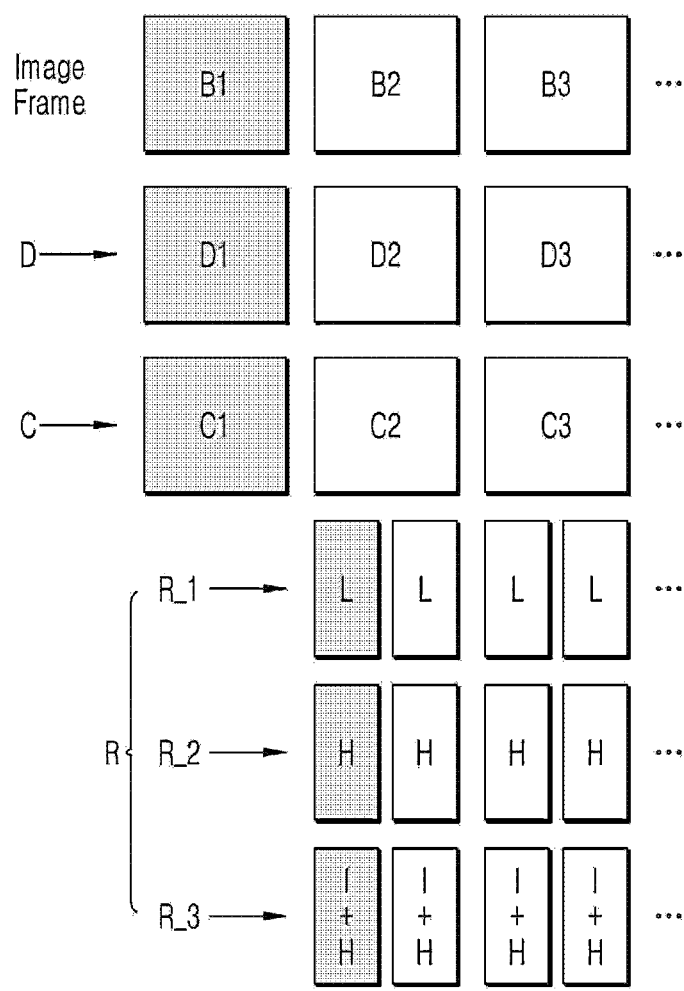
FIG. 6 is a diagram for describing a pipeline used in the facial recognition process according to an embodiment.

FIG. 6 is a diagram for describing a pipeline used in the facial recognition process according to an embodiment.

For facial recognition according to an embodiment, a content-adaptive parallel processing pipeline has been developed to adaptively select various facial recognition models according to a scene composition of the input image and process the facial recognition models in a mobile heterogeneous processor and a cloud.

The pipeline includes a detection pipeline D and a plurality of recognition pipelines R_1, R_2, and R_3 (R). The pipeline may further include a control pipeline C. In FIG. 6, three recognition pipelines R_1, R_2, and R_3 are exemplarily illustrated, and more or fewer recognition pipelines may be included depending on the type of the facial recognition model.

A plurality of image blocks B1, B2, and B3 divided from the input image is brought to the detection pipeline D of the pipeline in units of image blocks. For example, the image block B1 is processed in a detection block D1 of the detection pipeline D. The image block B2 and the image block B3 are processed in a detection block D2 and a detection block D3, respectively.

The detection block D1 of the detection pipeline D executes a face detection model to detect a face region in the image block B1. The detected face region is transmitted to the control pipeline C, the control block C1 determines a facial recognition model based on the facial recognition difficulty level, and transfer to a recognition pipeline (one of R_1, R_2 and R_3) associated with the determined facial recognition model is performed.

For example, the recognition pipeline R_1 may execute a lightweight facial recognition model for the face region (L), the recognition pipeline R_2 may execute a heavy facial recognition model (H), and the recognition pipeline R_3 may execute an identity clarification model and a heavy facial recognition model (I+H).

In another example, the recognition pipeline R_2 and the recognition pipeline R_3 may be integrated into one recognition pipeline and be in charge of execution of the identity clarification model and the heavy facial recognition model (I+H) together with execution of the heavy facial recognition model (H). In addition, the number of recognition pipelines and an execution model may be configured in various combinations according to an execution environment.

The detection pipeline D executes the detection block D2 for the image block B2 when execution of the detection block D1 is completed. That is, the detection pipeline D executes the detection block D2 for a subsequent image block D2 while facial recognition for the face region detected from the detection block D1 for the image block B1 in the recognition pipeline R proceeds in the recognition pipeline R. In this way, the detection pipeline D, the control pipeline C, and the recognition pipeline R form a parallel processing pipeline, and process facial recognition for the input image in parallel.

By introducing such a pipeline, it is possible to optimize a processing speed of a facial recognition algorithm that needs to repeatedly perform multiple DNN operations on high-resolution camera input (after performing face detection DNN on a high-resolution image, face resolution improvement is performed and a facial recognition DNN is executed per detected low-resolution face).

Figure 9:
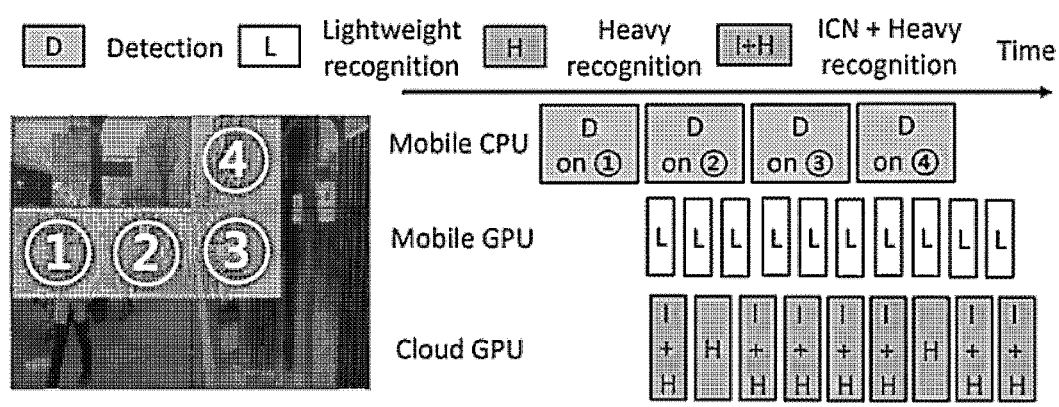
FIG. 9 is a diagram for describing parallel processing and pipelining for each region in the facial recognition method according to the embodiment.

FIG. 9 is a diagram for describing parallel processing and pipelining for each region in the facial recognition method according to the embodiment.

Processes of detecting and recognizing a face for each region in a high-resolution urban spatial image are independent of each other, and may be optimized through parallel processing and pipelining. Parallel processing and pipelining techniques for each image region (for each image block) optimize multi-DNN facial recognition latency by simultaneously utilizing a heterogeneous mobile processor (CPU and GPU) and a cloud GPU.

FIG. 9 illustrates an example of parallel processing and pipelining operations for each region. After face detection for one image area (image block) of the input image is performed by the mobile CPU, a facial recognition DNN operation for at least one face detected in the corresponding region is performed in parallel on the mobile GPU and the cloud GPU.

At the same time, face detection for a subsequent image region (image block) is simultaneously performed on the mobile CPU, so that the mobile GPU and cloud GPU may continuously perform facial recognition DNN operations.

In the example illustrated in FIG. 9, the mobile CPU corresponds to the detection pipeline D with reference to FIG. 6, the mobile GPU corresponds to the recognition pipeline R_1, and the cloud GPU corresponds to a recognition pipeline in which the recognition pipeline R_2 and the recognition pipeline R_3 are integrated. The control pipeline C of FIG. 6 may be executed by the mobile CPU.

The mobile CPU executes a face detection model for each image block along the detection pipeline D. Image blocks 1 to 4 are illustrated as examples and sequentially execute the face detection model in detection blocks 1 to 4, respectively.

The mobile GPU executes a lightweight facial recognition model on a face region where a facial recognition difficulty level in the detected face region is relatively low. The cloud GPU executes a heavy facial recognition model or executes an identity clarification model and a heavy facial recognition model on a face region where the facial recognition difficulty level in the detected face region is relatively high.

Figure 10:
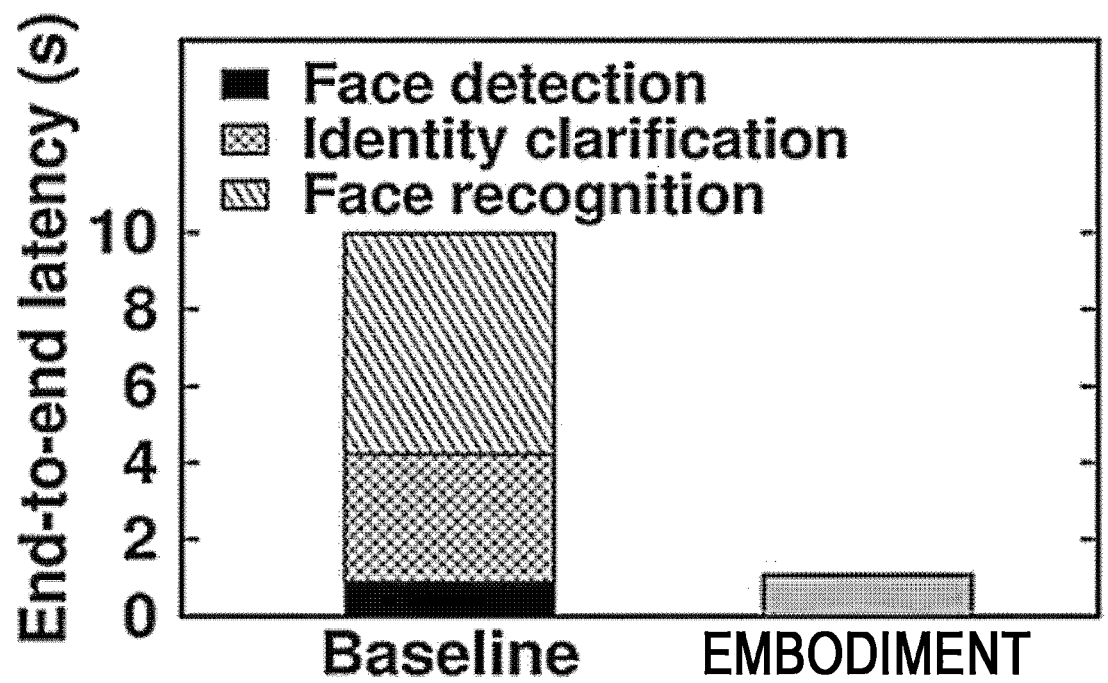
FIG. 10 is a graph showing performance of the facial recognition method according to an embodiment.

FIG. 10 is a graph illustrating performance of a facial recognition method according to an embodiment.

FIG. 10 illustrates performance of content-adaptive parallel processing pipeline technique according to an embodiment compared to the existing on-device sequential execution technique.

From the graph of FIG. 10, it can be seen that the content-adaptive parallel processing pipeline according to the embodiment performs parallel processing (spatial pipelining) on different regions in an image in the mobile CPU, GPU, and cloud to achieve a significant reduction in latency performance compared to the mobile device-based sequential DNN operation execution technique.

That is, as a result of applying the content-adaptive parallel processing pipeline to a plurality of included complex urban spatial images, it was confirmed that it is possible to achieve latency acceleration performance which is about 9.07 times higher than that of the existing on-device sequential DNN operation execution technology.

Figure 11:
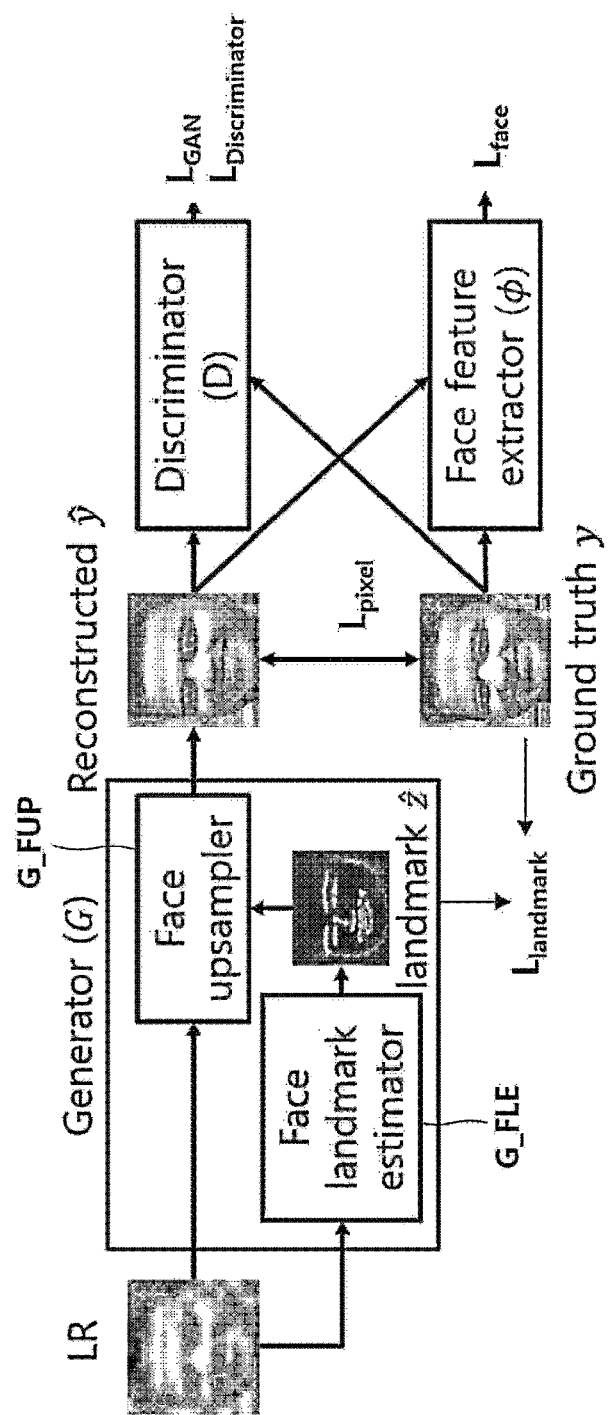
FIG. 11 is a diagram for illustratively describing an identity clarification model of a facial recognition algorithm used in the facial recognition method according to an embodiment.

FIG. 11 is a diagram for illustratively describing an identity clarification model of a facial recognition algorithm used in the facial recognition method according to an embodiment.

To accurately recognize a small face photographed from a long distance, a DNN and an ICN, which improve resolution of a high-resolution input face to reconstruct a high-resolution face, are designed.

The identity clarification model includes a DNN based on a generative adversarial neural network structure. The identity clarification model includes a generator G that generates a reconstructed face image (Reconstructed ŷ) from an input face image LR and a discriminator D that determines whether the reconstructed face image (Reconstructed ŷ) generated by the generator G corresponds to a correct face image (Ground Truth y) based on a correct face image (Ground Truth y) for the input face image LR.

The generator G and discriminator D are competition functions of a generative adversarial network (GAN), which define a GAN loss function L GAN for the generator G and a GAN loss function $L_{Discriminator}$ for the discriminator D.

The generator G includes a face landmark estimator G_FLE. The face landmark estimator G_FLE may extract at least one face landmark $\hat{z}$ from the low-resolution face image LR input to the generator G. Here, for example, the face landmark includes face contour information and feature information.

A landmark accuracy function $L_{landmark}$ to be described later is defined based on the face landmark estimated by the face landmark estimator G_FLE and the face landmark extracted from the correct face image.

By introducing the face landmark estimator G_FLE to the identity clarification model, reconstruction accuracy of the high-resolution face image (Reconstructed ŷ) may be improved in a process of reconstructing the high-resolution face by the generator G.

The generator D includes a Face Upsampler G_FUP. The face upsampler G_FUP generates a high-resolution face image (Reconstructed ŷ) reconstructed from a low-resolution face image LR based on at least one face landmark extracted from the face landmark estimator G_FLE.

A pixel accuracy function $L_{pixel}$ to be described later is defined based on pixel values of a face image reconstructed by the face upsampler G_FUP and a correct face image.

The discriminator D may include a residual block-based structure for GAN learning.

Additionally, the identity clarification model includes a face feature extractor ϕ. The face feature extractor ϕ extracts a feature map of the reconstructed face image (Reconstructed ŷ) and a feature map of the correct face image (Ground Truth y).

The face feature extractor ϕ defines a face feature similarity function $L_{face}$ to be described later based on the feature map of the reconstructed face image (Reconstructed ŷ) and the feature map of the correct face image (Ground Truth y).

For example, a facial recognition network of a residual block-based ArcFace network structure may be applied to the face feature extractor ϕ. However, the present invention is not limited thereto, and it is possible to include various neural network structures for facial recognition.

In an example, the identity clarification model may be allowed to obtain high reconstruction accuracy by alternately learning a first target function $L_{total}$ for the generator G to reconstruct a realistic face and a second target function $L_{Discriminator}$ for the discriminator D to distinguish between the face reconstructed by the generator G and the correct face.

Hereinafter, a facial recognition method using a content and resource-adaptive parallel processing pipeline according to an embodiment will be examined with reference to FIGS. 12 to 19.

Figure 12:
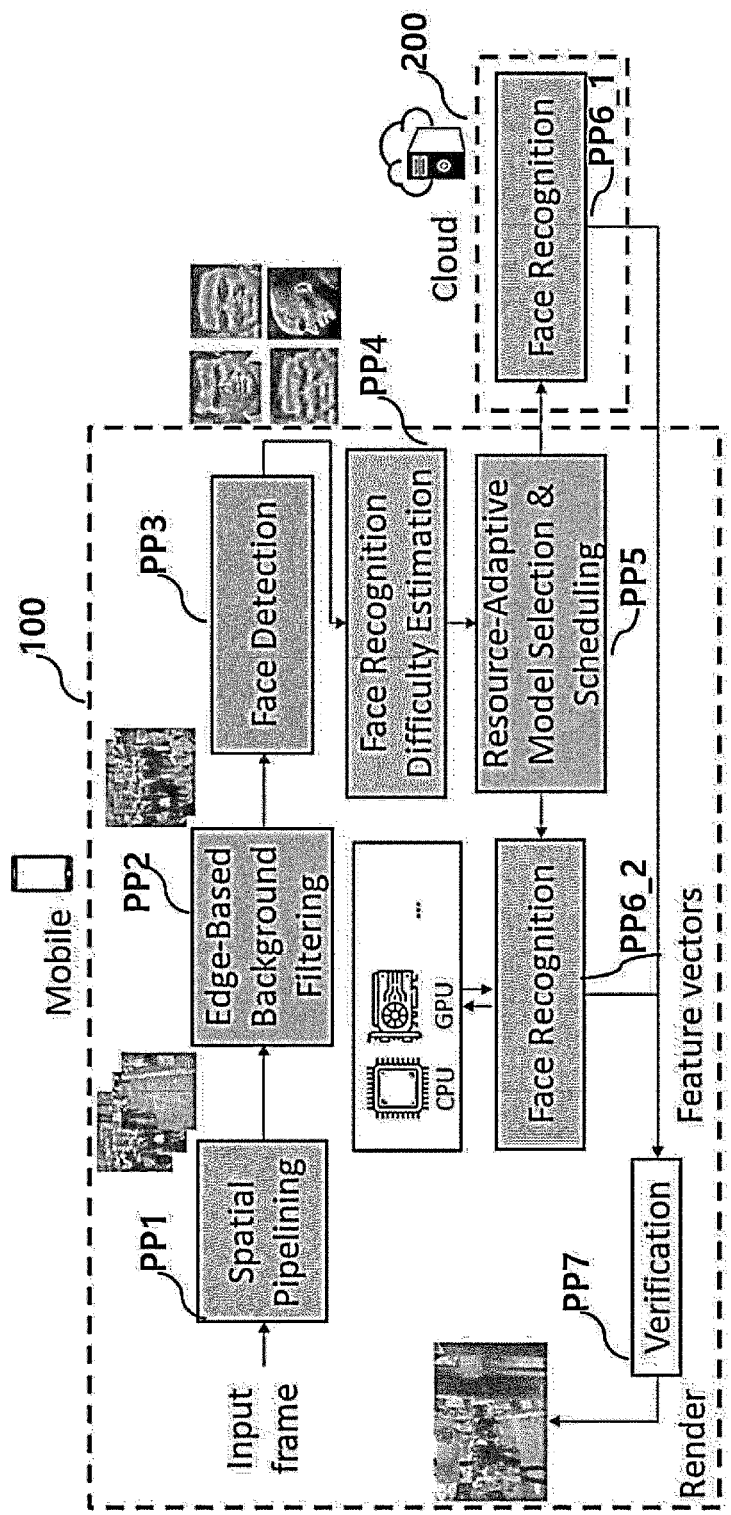
FIG. 12 is a diagram for describing a content and resource-adaptive parallel processing pipeline according to an embodiment.

FIG. 12 is a diagram for describing a content and resource-adaptive parallel processing pipeline according to an embodiment.

The facial recognition method and apparatus according to the embodiment uses a content-adaptive parallel processing pipeline that adaptively selects various DNNs according to a scene configuration of an input video and performs parallel processing in a mobile heterogeneous processor and the cloud in order to optimize a processing speed of a facial recognition algorithm that needs to repeatedly perform multiple DNN operations on high-resolution camera input (see FIG. 2, after performing face detection DNN on a high-resolution image, face resolution improvement is performed and a facial recognition DNN is executed per detected low-resolution face).

Recently, platforms that can perform DNN operations on mobile devices have been developed. However, the platforms do not support simultaneous execution of multiple DNNs for facial recognition in complex urban spaces since the platforms merely execute a single DNN operation.

The content-adaptive parallel processing pipeline provided in the embodiment (i) performs an edge detection algorithm before performing a face detection DNN on a high-resolution image to remove a background region where no face is present (Edge-Based Background Filtering) (see FIG. 7), (ii) predicts a difficulty level of facial recognition based on the resolution, posture, and blur of the detected face to adaptively adjust complexity of the facial recognition DNN (Variation-Adaptive Facial recognition) (see FIG. 15), and (iii) performs parallel processing for different regions in the image in the mobile CPU, GPU, and cloud (Spatial Pipelining) (see FIG. 12).

The facial recognition method according to the embodiment is performed in steps PP1, PP2, PP3, PP4, PP5, PP6_1, PP6_2, and PP7 illustrated in FIG. 12 by the first facial recognition apparatus 100 and the second facial recognition apparatus 200.

All or some of steps PP1, PP2, PP3, PP4, PP5, PP6_1, PP6_2, and PP7 illustrated in FIG. 12 may be performed in a facial recognition process for an input frame. The execution order of steps PP1, PP2, PP3, PP4, PP5, PP6_1, PP6_2, and PP7 illustrated in FIG. 12 may be changed. For example, step PP2 may be performed before step PP1 or vice versa.

Step PP1, step PP2, and step PP3 respectively correspond to step P1, step P2, and step P3 with reference to FIG. 4. Step PP7 corresponds to step P6 with reference to FIG. 4.

In step PP1, the first facial recognition apparatus 100 acquires a camera frame input (Input frame). For example, real-time camera frame input is acquired from AR glasses or a smartphone camera.

In step PP2, the first facial recognition apparatus 100 removes a background region based on edge detection. For example, an input frame is divided into regions, edges (outlines) are detected for each region, and a background region having a low edge density is removed from processing to reduce unnecessary operations.

In step PP3, the first facial recognition apparatus 100 detects at least one face region from the image block of the input frame.

Additionally, in step PP3, the first facial recognition apparatus 100 may perform motion tracking-based recognition result caching to predict movements of faces in consecutive frames. For example, when it is determined that a face detected in a current frame corresponds to a face for which the recognition model has previously been performed in a previous frame, a recognition result is cached and reused.

In step PP4, the first facial recognition apparatus 100 predicts the facial recognition difficulty level. In an example, the first facial recognition apparatus 100 performs face detection in step PP3 on the region filtered in step PP2, predicts recognition difficulty levels of detected individual faces, and then performs sorting for each difficulty level.

In step PP5, the first facial recognition apparatus 100 selects a resource-adaptive facial recognition model and determines an execution schedule.

For example, the first facial recognition apparatus 100 may predict a recognition difficulty level of the face analyzed in step PP4 and an available resource status of the first facial recognition apparatus 100 and the second facial recognition apparatus 200, thereby selecting a recognition model that can comprehensively optimize the facial recognition accuracy and processing time.

In steps PP6_1 and PP6_2, the first facial recognition apparatus 100 and the second facial recognition apparatus 200 execute multiprocessor parallel processing and pipelining for each region. The first facial recognition apparatus 100 and the second facial recognition apparatus 200 utilize the independence of the face detection and recognition task for each region in the image and the independence of the individual facial recognition task to process the operations assigned to the mobile CPU, GPU, and cloud GPU in parallel.

In step PP7, the first facial recognition apparatus 100 provides recognition result integration and rendering. The individual faces recognized in step PP5 are compared with the search target to render a location of a face matching the search target on a user terminal, for example, on a screen of the first facial recognition apparatus 100 and shown to the user.

Figure 13:
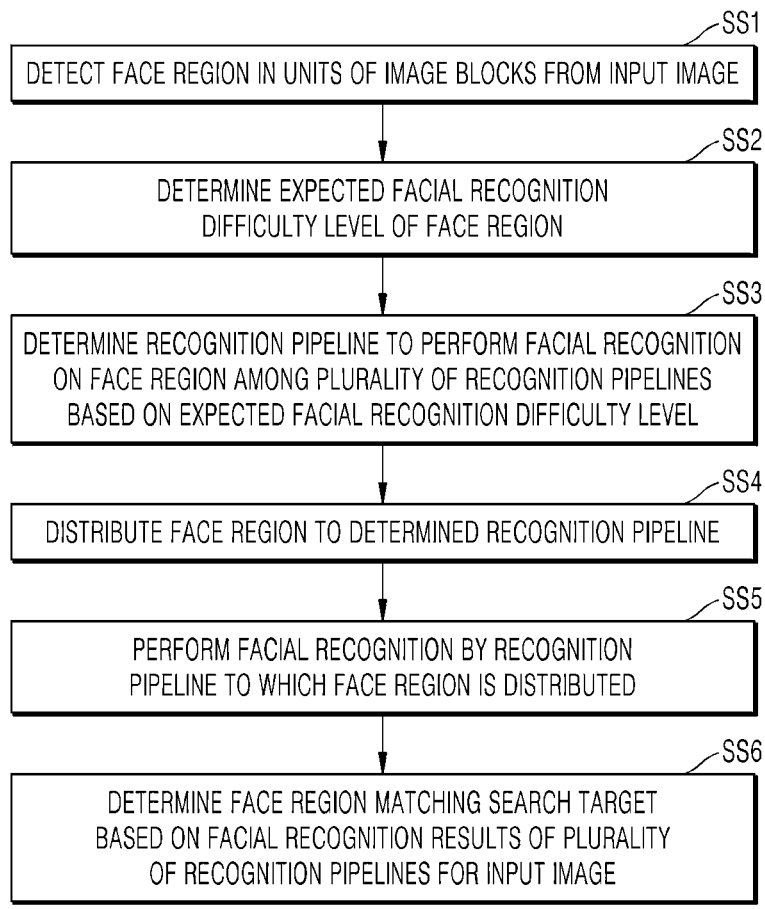
FIG. 13 is a flowchart of a facial recognition method according to an embodiment.

FIG. 13 is a flowchart of a facial recognition method according to an embodiment.

The facial recognition method according to the embodiment is a facial recognition method executed by a facial recognition apparatus including a processor using a pipeline including a detection pipeline, a control pipeline, and a plurality of recognition pipelines, and the facial recognition method may include step SS1 of detecting, by a detection pipeline, at least one face region in units of image blocks from an input image, step SS2 of determining, by a control pipeline, an expected facial recognition difficulty level of the at least one face region, step SS3 of determining, by the control pipeline, a recognition pipeline to perform facial recognition on each of the at least one face region among the plurality of recognition pipelines based on the expected facial recognition difficulty level, step SS4 of distributing, by the control pipeline, the at least one face region to the determined recognition pipeline, and step SS5 of performing facial recognition from each of the at least one face region by a recognition pipeline to which the at least one face region is distributed.

In step SS1, the processor 110 of the facial recognition apparatus 100 detects the at least one face region from the input image in units of image blocks by the detection pipeline. Step SS1 corresponds to step S1 with reference to FIG. 5.

After step SS1, the processor 110 may perform motion tracking-based recognition result caching to predict motion of faces in consecutive frames. For example, when it is determined that a face detected in a current frame corresponds to a face previously subjected to a recognition model in a previous frame, a recognition result is cached and reused, which will be described later with reference to FIG. 14.

In step SS2, the processor 110 determines the expected facial recognition difficulty level of the at least one face region by the control pipeline.

In step SS2, the processor 110 may determine each expected facial recognition difficulty level of the at least one face region based on at least one of the face resolution, the facial posture, or the facial blur of the face region, which will be described later with reference to FIG. 15.

In step SS3, the processor 110 determines, by the control pipeline, a recognition pipeline to perform facial recognition for each of at least one face region among a plurality of recognition pipelines based on the expected facial recognition difficulty level.

Step SS3 may include a step of determining a recognition pipeline of each face region of the at least one face region in ascending order of the expected facial recognition difficulty level.

Step SS3 may include a step of determining a combination of a facial recognition model to be applied to each face region and a facial recognition apparatus to execute the facial recognition model based on a predetermined target function according to the expected facial recognition accuracy of the face region and the expected operation latency, which will be described later with reference to FIGS. 18 and 19.

In step SS4, the processor 110 distributes at least one face region to the recognition pipeline determined by the control pipeline.

In an example, at least some of the detection pipeline, the control pipeline, and the plurality of recognition pipelines are disposed on the first facial recognition apparatus 100, the remainder of the plurality of recognition pipelines is disposed on the second facial recognition apparatus 200, and step SS4 may include a step of offloading facial recognition for at least some of the at least one face region from the first facial recognition apparatus 100 to the second facial recognition apparatus 200, which corresponds to offloading-related content of step S3 with reference to FIG. 5.

In step SS5, the processor 110 and/or a processor 210 performs facial recognition from each of the at least one face region by a recognition pipeline to which the at least one face region is distributed.

Additionally, the facial recognition method according to the embodiment may further include step SS6 of determining a face region matching the search target based on facial recognition results of a plurality of recognition pipelines for the input image. Step SS6 corresponds to step S5 with reference to FIG. 5.

Additionally, the facial recognition method according to the embodiment may further include a step of detecting a face region for a subsequent image block of an input image by a detection pipeline while facial recognition for at least one face region is performed by a recognition pipeline to which at least one face region is distributed. An example thereof will be described with reference to FIG. 19.

Figure 14:
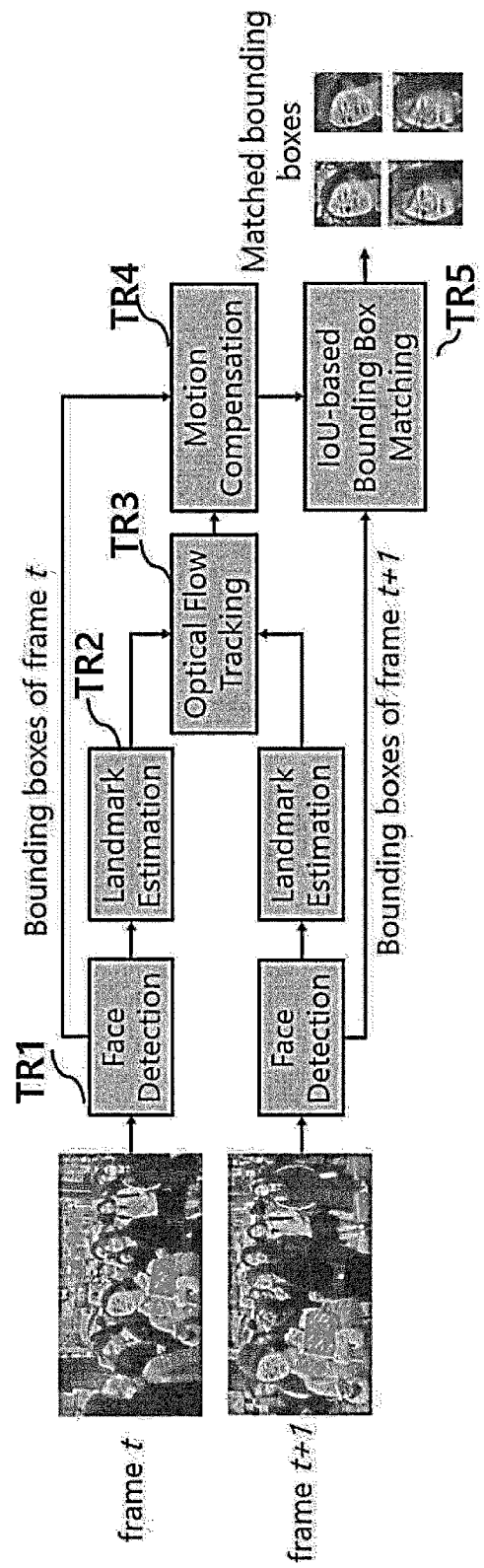
FIG. 14 is a diagram for describing a motion tracking process of the facial recognition process.

FIG. 14 is a diagram for describing a motion tracking process of a facial recognition process.

In step SS1, the processor 110 detects faces of people having various identities from video frames captured in urban space.

When the input image is a video including a series of frames, the facial recognition apparatus 100 may receive a face frame sequence of a person having the same identity as an input. That is, even though a face is detected for each frame of the input video, a face of a person having the same identity may appear at different locations over time due to camera movement or movement of an object in a scene between successive frames.

Here, when face images detected from successive frames including camera movement, movement of a face within a scene, etc. are mapped to the same identity, a previously stored facial recognition result may be reused. For example, for a face image determined to have the same identity as that of a face image for which facial recognition has previously been completed, a previously stored facial recognition result may be reused and steps SS2 to SS6 may not be executed.

To this end, the facial recognition method according to the embodiment may use a feature point-based face tracking technique to map faces detected for each frame between the same identities in consideration of movement of the face between consecutive frames of the input video after step SS1.

In an example, the facial recognition method according to the embodiment may further include a step of searching for a previously recognized face region corresponding to each of the at least one face region detected in step SS1 based on face region movement information (that is, motion tracking information) between successive image frames of a series of image frames, and a step of reusing facial recognition information of a previously recognized face region according to a search result.

When a face detected in a current frame has previously been processed in a previous frame by utilizing a temporal correlation between successive frames of video content, a previous result is reused without performing a new recognition model operation. In order to understand the correspondence between faces detected in consecutive frames, the following face tracking process is performed.

(i) Step TR1—Face Detection: First, each face is detected in two consecutive input frames (frame t, frame t+1).

(ii) Step TR2—Landmark Estimation: Landmarks (for example, positions of eyes, nose, and mouth) are extracted from detected individual faces as feature points. To this end, for example, it is possible to use a RetinaFace detector (J. Deng et al., "RetinaFace: Single-stage Dense Face Localization in the Wild," CVPR 2020.) capable of simultaneously performing face detection and feature point extraction.

(iii) Step TR3—Optical Flow Tracking: Thereafter, an optical flow is calculated to find the corresponding landmark between frame t and frame t+1. For example, it is possible to use the Lukas-Kanade Optical Flow Tracker (B. D. Lucas, T. Kanade et al., "An iterative image registration technique with an application to stereo vision." Vancouver, British Columbia, 1981).

(iv) Step TR4—Motion Compensation: An average of optical flows of feature points of the landmarks (for example, eyes, nose, and mouth) calculated in step TR3 is obtained. The average is presumed as movement of the object between frames, and coordinates of a face bounding box of frame t are transformed.

(v) Step TR5—IoU-based Bounding Box Matching: An Intersection over Union (IoU) between bounding boxes of frame t and bounding boxes of frame t+1 undergoing the process of step TR4 is calculated to calculate the area of an overlapping region. When two bounding boxes having an IoU equal to or greater than a certain value are detected, the corresponding two faces are determined as the same identity.

Figure 15:
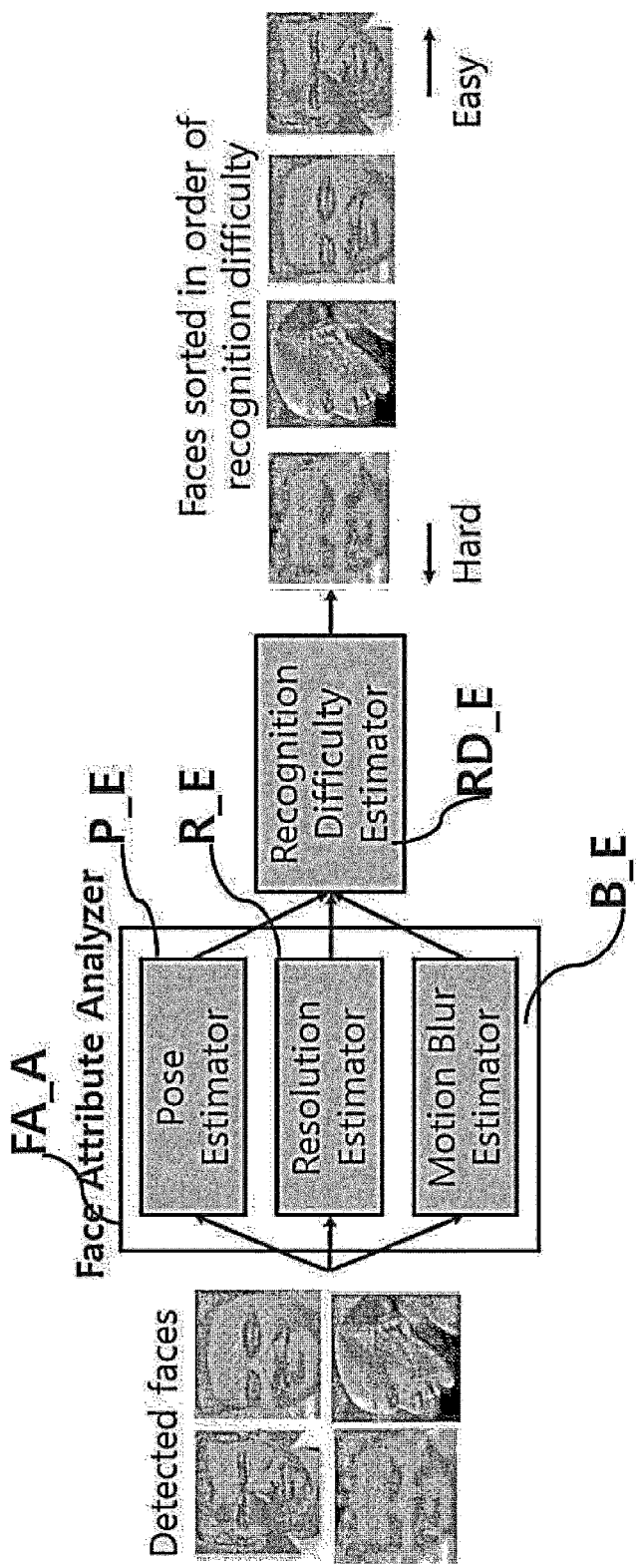
FIG. 15 is a diagram for describing a process of determining an expected facial recognition difficulty level according to an embodiment.

FIG. 15 is a diagram for describing a process of determining an expected facial recognition difficulty level according to an embodiment.

When a face is detected in an urban spatial image including a plurality of faces, a large deviation occurs in the facial recognition difficulty level according to an environment in which individual faces are captured. When a recognition difficulty level of the detected face is analyzed and an optimal recognition model is selected based thereon, resource consumption and recognition latency may be optimized.

For example, in the case of a large face that is close to the camera, when a light facial recognition DNN model is selected since a recognition difficulty level is low, high accuracy may be obtained even with low resource consumption (for example, a Residual block (K. He et al., "Deep residual learning for image recognition," CVPR 2016.)-based ArcFace model (J. Deng et al., "ArcFace: Additive Angular Margin Loss for Deep Facial recognition," CVPR 2019.) and a lightweight MobileFaceNets model (S. Chen et al., "MobileFaceNets: Efficient CNNs for Accurate Real-Time Face Verification on Mobile Devices," CCBR 2018.) are different from each other in execution time by 20 times in the latest LG V50 smartphone (287 vs. 14 ms) and have the same accuracy). On the other hand, in the case of a low-resolution face at a long distance, a recognition difficulty level is high. Thus, for accurate recognition, it is essential to select a complex facial recognition DNN after improvement of identity resolution (identity clarification).

In an embodiment, in order to achieve optimal facial recognition accuracy and latency performance, the recognition difficulty level of the detected face is predicted, and an optimal recognition model is selected based thereon.

FIG. 15 is a structural diagram of facial recognition difficulty analysis, and widely considers various factors affecting recognition accuracy in order to analyze the facial recognition difficulty level.

Specifically, the Face Attribute Analyzer (FA_A) analyzes the following three elements for each detected face based on lightweight image processing techniques.

(i) Pose Estimator (P_E): The posture of the face may be analyzed through the detected positions of landmarks such as eyes, a nose, and a mouth. For example, the facial posture may be determined according to θ, which will be described with reference to FIG. 16.

(ii) Resolution Estimator (R_E): From the size of the bounding box of the detected face, the face resolution is predicted as in Equation (1).

$$r = H \cdot W \quad \text{[Equation 1]}$$

(r: face resolution, H·W: height and width of bounding box)

(iii) Motion Blur Estimator (B_E): To detect blur according to movement of a face image, after converting an input RGB image to grayscale, a Laplacian filter L (Equation 2) that can obtain the second derivative of pixel values is applied. Then, the average intensity of the converted image is calculated as in Equation 3 to obtain the blur intensity b.

$$L = \begin{bmatrix} 0 & 1 & 0 \\ 1 & -4 & 1 \\ 0 & 1 & 0 \end{bmatrix} \quad \text{[Equation 2]}$$

$$B = \frac{1}{HW} \sum_{i=1}^{H} \sum_{j=1}^{W} X_{i,j} \quad \text{[Equation 3]}$$

X: Image with grayscale transformation and Laplacian filter applied

That is, by applying gray scale transformation and Laplace filter to the face image, the blur intensity of the face image is obtained. For example, it is predicted that the lower the blur intensity, the higher the expected facial recognition difficulty level. An example thereof will be seen in FIG. 17.

(iv) Finally, the recognition difficulty estimator (RD_E) calculates a finally predicted recognition difficulty level by combining the above three factors as in Equation (4).

$$D = f(\theta \cdot r \cdot B) \quad \text{[Equation 4]}$$

For example, a difficulty prediction function $f$ may utilize, but is not limited to, Support Vector Machine (C. Cortes et al., "Support-vector networks." Machine learning 20.3 (1995): 273 to 297).

Thereafter, the detected faces are sorted according to the predicted facial recognition difficulty level and used for selection of a resource-adaptive facial recognition model and execution scheduling.

Figure 16:
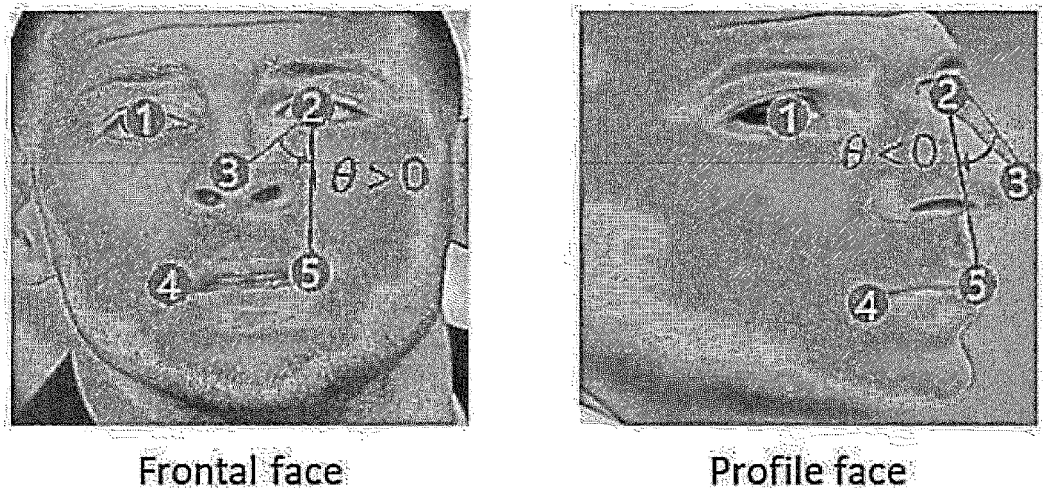
FIG. 16 is an illustrative diagram of landmark-based facial posture determination in facial recognition difficulty level determination according to an embodiment.

FIG. 16 is an illustrative diagram of landmark-based facial posture determination in facial recognition difficulty level determination according to an embodiment.

When the detected face landmark is given as illustrated in FIG. 16, the face angle θ may be predicted as in [Equation 5]. For example, as a face is more likely to be a side face, θ is more likely to be negative.

$$\theta = \cos^{-1}(\vec{v}_{23}, \vec{v}_{25}) \quad \text{[Equation 5]}$$

Figure 17:
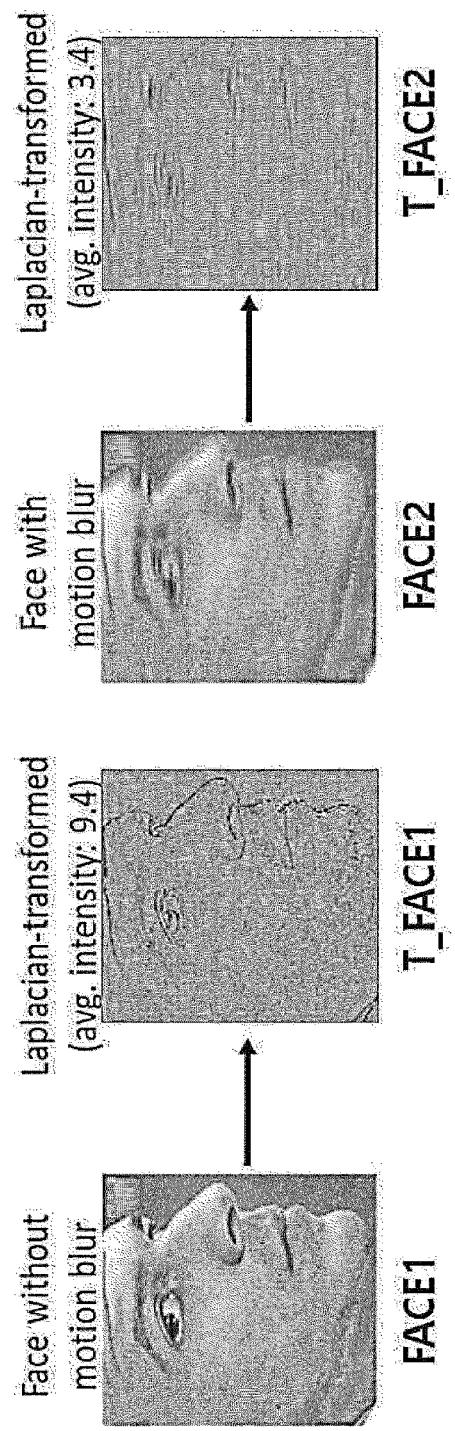
FIG. 17 is an illustrative diagram of determining facial blur in the facial recognition difficulty level determination according to an embodiment.

FIG. 17 is an illustrative diagram of determining facial blur in the facial recognition difficulty level determination according to an embodiment.

FIG. 17 illustrates an example of a blur estimation operation based on the above-described Laplacian filtering.

In the illustrated example, a blur intensity value obtained from a transformation result (T_FACE1) of a face image without blur (FACE1) is higher than a blur intensity value obtained from a transformation result (T_FACE2) of a face image with blur (FACE2).

Figure 18:
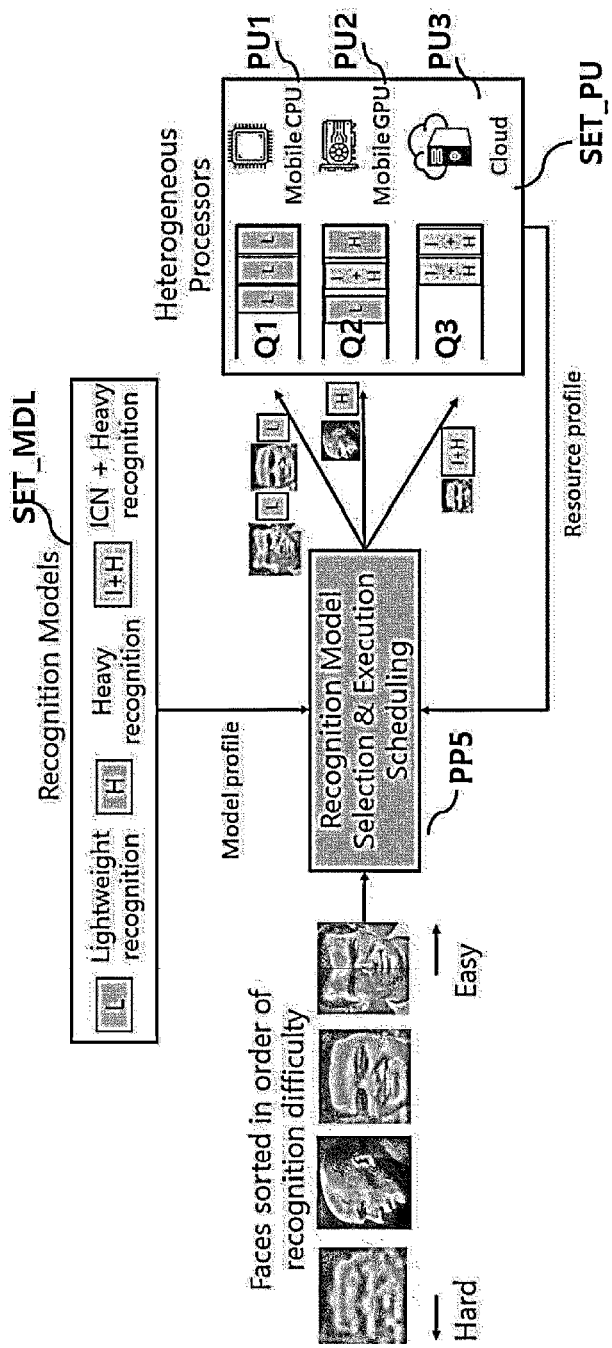
FIG. 18 is a diagram for describing content and resource-adaptive facial recognition model selection and execution scheduling according to an embodiment.

FIG. 18 is a diagram for describing content and resource-adaptive facial recognition model selection and execution scheduling according to an embodiment.

Referring to FIG. 12, in step PP5, the processor 110 of the facial recognition apparatus 100 selects a recognition model capable of comprehensively optimizing the recognition accuracy and latency and performs execution scheduling based on currently available resources for faces sorted according to the predicted facial recognition difficulty level (for example, sorted in ascending order of difficulty), which corresponds to steps SS3 and SS4 described above with reference to FIG. 13.

Specifically, assuming that a recognition model $M_l$ is selected for a detected face $f_l$, the facial recognition accuracy $ACC(M_l(f_l))$ is predicted.

With regard to the facial recognition accuracy of the model, a facial recognition difficulty level is predicted through the above-described Equation 4 for each individual face with respect to a facial recognition benchmark dataset having various difficulty levels (for example, the Cross-Pose LFW dataset including various posture changes (T. Zheng et al., "Cross-Pose LFW: A Database for Studying Cross-Pose Facial recognition in Unconstrained Environments," Beijing University of Posts and Telecommunications, Tech. Rep 2018), a VGGFace2 dataset having various image resolution changes (Q. Cao et al., "VGGFace2: A dataset for recognizing faces across pose and age," F&G 2018), and a UHDB31 dataset including various lighting environment changes (H. Le et al., "UHDB31: A Dataset for Better Understanding Facial recognition across Pose and Illumination Variation," ICCV 2017)), and the actual recognition accuracy is measured by utilizing a facial recognition model. In this way, a mapping table between <facial recognition difficulty level and recognition accuracy> is created, a recognition difficulty level of an input face image is estimated in an actual test stage, and then the corresponding value on the mapping table is read to predict the recognition accuracy.

In addition, when the corresponding recognition model $M_l$ is performed in a processor $P_l$, a latency $L(M_o P_l)$ is predicted. For example, the operation latency may be predicted as the sum of an inference time of the model and a time when all tasks currently being performed by the processor are finished. In other words, the operation latency may be predicted as the sum of the inference time of the corresponding model in the processor $P_l$ and the time when all the tasks waiting in a work queue Qi of the processor $P_l$ are finished with reference to FIG. 18, which will be described later.

In summary, an optimal combination $(f_i, M_l, P_l)$ is determined to maximize [Equation 6], which is the target function, for the detected faces. At this time, scheduling is performed so that the total operation latency does not exceed application requirements $L_{deadline}$ of [Equation 7].

$$\max\left(\frac{1}{N}\sum_{i=1}^{N}(Acc(M_i(f_i)) - \alpha \cdot L(M_i, P_i))\right) \quad \text{[Equation 6]}$$

$$\text{s.t.,} \sum_{i=1}^{N} L(M_i, P_i) \leq L_{deadline} \quad \text{[Equation 7]}$$

In an embodiment, a recognition model set SET_MDL may include a heavy recognition model H, a lightweight recognition model L, and a model I+H in which a face-resolution improvement model (ICN) and a heavy recognition model H are associated with each other.

For example, the heavy recognition model may utilize a residual block-based ArcFace network structure, a lightweight recognition model may utilize a light MobileFaceNets structure (S. Chen et al., "MobileFaceNets: Efficient CNNs for Accurate Real-Time Face Verification on Mobile Devices," CCBR 2018), and a low-resolution face resolution improvement model may utilize an ICN structure with reference to FIG. 111, and the present invention is not limited thereto.

In an embodiment, a selectable processor set SET_PU may include heterogeneous processors.

For example, the selectable processor set SET_PU may include a Mobile CPU (PU1), a Mobile GPU (PU2), and a Cloud GPU (PU3). However, the present invention is not limited thereto, and it is possible to include processing units of various types and operation methods.

Step SS3 described above with reference to FIG. 13 may include a step of determining a combination of a facial recognition model to be applied to a face region and a facial recognition apparatus to execute the facial recognition model based on a predetermined target function according to the expected facial recognition accuracy of the face region and the expected operation latency. That is, determining the recognition pipeline means determining a facial recognition model to be used for facial recognition for a given face region and a facial recognition apparatus to execute the facial recognition model.

Processors in the processor set SET_PU each operate job queues thereof (for example, Q1, Q2, and Q3), and fetch and execute jobs (tasks) from the job queues in a FIFO manner.

When the recognition pipeline is determined in step SS3, in step SS4 described above with reference to FIG. 13, a facial recognition task of the corresponding face region is distributed along the recognition pipeline determined in step SS3. For example, the processor 110 adds job information including a target face region and a facial recognition model to be used (for example, L) to a work queue (for example, Q1) of a processor (for example, assumed to be PU1) for executing facial recognition of the corresponding face region.

Figure 19:
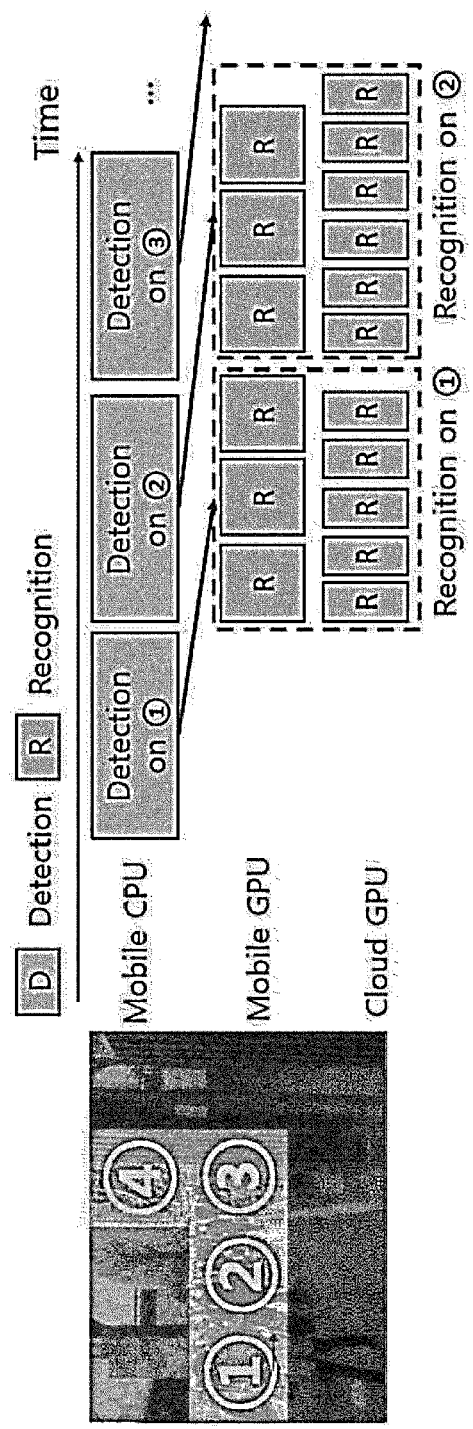
FIG. 19 is an illustrative diagram of multiprocessor parallel processing and pipelining for each region according to an embodiment.

FIG. 19 is an illustrative diagram of multiprocessor parallel processing and pipelining for each region according to an embodiment.

In the facial recognition technology according to the embodiment, processes of (i) detecting a face for each region in a high-resolution urban spatial image, and (ii) recognizing individual faces are independent of each other and may be optimized through parallel processing and pipelining.

The parallel processing and pipelining techniques for each region optimize the multi-DNN facial recognition latency by simultaneously utilizing heterogeneous mobile processors (CPU and GPU) and a cloud GPU.

Specifically, FIG. 19 illustrates an example of parallel processing and pipelining for each region. After face detection for a first image region is performed on the mobile CPU (for example, Detection on 1), facial recognition DNN operations for faces detected in the first image region are performed in parallel on the mobile and cloud GPU (for example, Recognition on 1).

At the same time, face detection for a second image region and a third image region, which are subsequent image regions, is performed on the mobile CPU (for example, Detection on 2 and Detection on 3), so that continuous facial recognition DNN operation (for example, Recognition on 2) may be performed on the mobile and cloud GPU.

The facial recognition technique according to the embodiment is applicable to several useful mobile AR applications (for example, finding missing children and tracking criminals) based on facial recognition, and may be applied to a mobile deep learning platform for AR applications requiring simultaneous execution of multiple DNN and rendering operations in a mobile device.

Meanwhile, the proposed mobile heterogeneous processor and cloud-based multi-DNN operation execution technique may be used not only in a facial recognition field, but also in various mobile/embedded AI systems based on multiple DNNs that are emerging recently, such as an airport facial recognition-based automatic immigration system, IoT, and autonomous driving.

The facial recognition method according to the embodiment may be implemented as Java-based software that may be executed by an Android device, and may be installed and utilized in a plurality of commercial Android smartphones.

The DNN-based facial recognition technology according to the embodiment may be implemented with Google TensorFlow, and may be converted into Google TensorFlow-Lite for Android and executed.

According to the embodiments, it is possible to effectively perform facial recognition from a high-resolution input image in a resource-limited mobile device.

According to the embodiments, the processing speed of multiple DNN operations is improved.

Effects of the present invention are not limited to those mentioned above, and other effects not mentioned herein will be clearly understood by those skilled in the art from the above description.

The method according to the embodiment of the present invention described above may be implemented as computer-readable code on a medium in which a program is recorded. The computer-readable medium includes all types of recording devices in which data readable by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, an optical data storage device, etc.

The facial recognition method according to the embodiment may be stored in a computer-readable non-transitory recording medium in which a computer program including one or more instructions for executing the method is recorded.

The above description of the embodiments of the present invention is for illustration, and it should be understood that those of ordinary skill in the art to which the present invention pertains may easily perform modification into other specific forms without changing the technical spirit or essential features of the present invention. Therefore, it should be understood that the embodiments described above are illustrative in all respects and not restrictive. For example, each component described as a single type may be implemented in a dispersed form, and likewise components described as distributed may be implemented in a combined form.

The scope of the present invention is indicated by the following claims rather than the above detailed description, and all changes or modifications derived from the meaning and scope of the claims and equivalents thereto should be construed as being included in the scope of the present invention.

What is claimed is:

1. A facial recognition method executed by a facial recognition apparatus including a processor using a pipeline including a detection pipeline, a control pipeline, and a plurality of recognition pipelines, the facial recognition method comprising:
   dividing, by a detection pipeline, an input image into a plurality of image blocks;
   determining, by the detection pipeline for each of the plurality of image blocks, an edge density of the image block based upon changes in pixel intensity values in the image block;
   removing, by the detection pipeline from the plurality of image blocks, image blocks with an edge density that is less than or equal to a reference density;
   detecting, by the detection pipeline, at least one face region in the remaining image blocks;
   determining, by a control pipeline, an expected facial recognition difficulty level of the at least one face region;
   determining, by the control pipeline, a recognition pipeline to perform facial recognition on each of the at least one face region among the plurality of recognition pipelines based on the expected facial recognition difficulty level, including determining a combination of a facial recognition model to be applied to the face region and a facial recognition apparatus to execute the facial recognition model based on a predetermined target function according to an expected facial recognition accuracy of a face region and an expected operation latency;
   distributing, by the control pipeline, the at least one face region to the determined recognition pipeline; and
   performing facial recognition from each of the at least one face region by a recognition pipeline to which the at least one face region is distributed.

2. The facial recognition method according to claim 1, wherein the determining the expected facial recognition difficulty level includes determining an expected facial recognition difficulty level of each of the at least one face region based on at least one of a face resolution, a facial posture, or facial blur of a face region.

3. The facial recognition method according to claim 1, wherein the determining the recognition pipeline includes determining a recognition pipeline of each face region of the at least one face region in ascending order of the expected facial recognition difficulty level.

4. The facial recognition method according to claim 1, wherein:
   at least some of the detection pipeline, the control pipeline, and the plurality of recognition pipelines are disposed in a first facial recognition apparatus;
   a remainder of the plurality of recognition pipelines is disposed in a second facial recognition apparatus; and
   the distributing includes offloading facial recognition for at least some of the at least one face region from the first facial recognition apparatus to the second facial recognition apparatus.

5. The facial recognition method according to claim 1, further comprising detecting a face region for a subsequent image block of the input image by the detection pipeline while facial recognition for at least one face region is performed by the recognition pipeline to which the at least one face region is distributed.

6. The facial recognition method according to claim 1, further comprising determining a face region matching a search target based on a facial recognition result of the plurality of recognition pipelines for the input image.

7. The facial recognition method according to claim 1, wherein:
   the input image includes a series of image frames, and
   the facial recognition method further comprises:
   searching for a previously recognized face region corresponding to each of the at least one face region based on face region movement information between successive image frames of the series of image frames; and
   reusing facial recognition information of the previously recognized face region according to a result of the searching.

8. A facial recognition apparatus using a pipeline including a detection pipeline, a control pipeline, and a plurality of recognition pipelines, the facial recognition method comprising:
   at least one processor,
   wherein the at least one processor is configured to:
   execute a detection pipeline to divide an input image into a plurality of image blocks;

execute the detection pipeline to determine, for each of the plurality of image blocks, an edge density of the image block based upon changes in pixel intensity values in the image block;

execute the detection pipeline to remove, from the plurality of image blocks, image blocks with an edge density that is less than or equal to a reference density;

execute the detection pipeline to detect at least one face region in the remaining image blocks;

execute a control pipeline to determine an expected facial recognition difficulty level of the at least one face region;

execute the control pipeline to determine a recognition pipeline to perform facial recognition for each of the at least one face region among the plurality of recognition pipelines based on the expected facial recognition difficulty level, including determining a combination of a facial recognition model to be applied to the face region and a facial recognition apparatus to execute the facial recognition model based on a predetermined target function according to an expected facial recognition accuracy of a face region and an expected operation latency; and execute the control pipeline to distribute the at least one face region to the determined recognition pipeline.

9. The facial recognition apparatus according to claim 8, wherein, to determine the expected facial recognition difficulty level, the at least one processor is configured to determine an expected facial recognition difficulty level of each of the at least one face region based on at least one of a face resolution, a facial posture, or facial blur of a face region.

10. The facial recognition apparatus according to claim 8, wherein, to determine the recognition pipeline, the at least one processor is configured to determine a recognition pipeline of each face region of the at least one face region in ascending order of the expected facial recognition difficulty level.

11. The facial recognition apparatus according to claim 8, wherein:
at least some of the detection pipeline, the control pipeline, and the plurality of recognition pipelines are disposed in the facial recognition apparatus;
a remainder of the plurality of recognition pipelines is disposed in a second facial recognition apparatus; and
to distribute the at least one face region, the at least one processor offloads facial recognition for at least some of the at least one face region from the facial recognition apparatus to the second facial recognition apparatus.

12. The facial recognition apparatus according to claim 8, wherein the at least one processor is configured to detect a face region for a subsequent image block of the input image by the detection pipeline while facial recognition for at least one face region is performed by a recognition pipeline to which the at least one face region is distributed.

13. The facial recognition apparatus according to claim 8, wherein the at least one processor is configured to determine a face region matching a search target based on a facial recognition result of the plurality of recognition pipelines for the input image.

14. The facial recognition apparatus according to claim 8, wherein:
the input image includes a series of image frames, and
the at least one processor is configured to:
search for a previously recognized face region corresponding to each of the at least one face region based on face region movement information between successive image frames of the series of image frames; and
reuse facial recognition information of the previously recognized face region according to a result of the searching.

15. A facial recognition system using a pipeline including a detection pipeline, a control pipeline, and a plurality of recognition pipelines, the facial recognition system comprising:
a first facial recognition apparatus in which at least some of a detection pipeline, a control pipeline, and a plurality of recognition pipelines are disposed; and
a second facial recognition apparatus in which a remainder of the plurality of recognition pipelines is disposed,
wherein the first facial recognition apparatus is configured to:
divide, by the detection pipeline, an input image into a plurality of image blocks;
determine, by the detection pipeline for each of the plurality of image blocks, an edge density of the image block based upon changes in pixel intensity values in the image block;
remove, by the detection pipeline from the plurality of image blocks, image blocks with an edge density that is less than or equal to a reference density;
detect, by the detection pipeline, at least one face region the remaining image blocks;
determine, by the control pipeline, an expected facial recognition difficulty level of the at least one face region;
determine, by the control pipeline, a recognition pipeline to perform facial recognition on each of the at least one face region among the plurality of recognition pipelines based on the expected facial recognition difficulty level, including determining a combination of a facial recognition model to be applied to the face region and a facial recognition apparatus to execute the facial recognition model based on a predetermined target function according to an expected facial recognition accuracy of a face region and an expected operation latency;
distribute, by the control pipeline, the at least one face region to the determined recognition pipeline; and
detect a face region for a subsequent image block of the input image by the detection pipeline while facial recognition for the detected face region is performed by a recognition pipeline to which the at least one face region is distributed.

* * * * *